(12) United States Patent
Walters et al.

(10) Patent No.: US 11,809,968 B2
(45) Date of Patent: Nov. 7, 2023

(54) CONTROL OF HYPERPARAMETER TUNING BASED ON MACHINE LEARNING

(71) Applicant: Capital One Services, LLC, McLean, VA (US)

(72) Inventors: Austin Grant Walters, Savoy, IL (US); Jeremy Edward Goodsitt, Champaign, IL (US); Anh Truong, Champaign, IL (US); Mark Louis Watson, Sedona, AZ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/799,227

(22) Filed: Feb. 24, 2020

(65) Prior Publication Data

US 2021/0264199 A1    Aug. 26, 2021

(51) Int. Cl.
  *G06N 20/00*       (2019.01)
  *G06F 18/21*       (2023.01)
  *G06F 18/2115*     (2023.01)

(52) U.S. Cl.
  CPC .......... *G06N 20/00* (2019.01); *G06F 18/217* (2023.01); *G06F 18/2115* (2023.01)

(58) Field of Classification Search
  CPC .... G06K 9/6231; G06K 9/6262; G06N 20/20; G06N 20/10; G06N 20/00
  USPC ........................................................... 706/1
  See application file for complete search history.

(56) References Cited

U.S. PATENT DOCUMENTS

| 10,417,558 B1* | 9/2019 | Carothers | G06N 3/063 |
| 10,810,512 B1* | 10/2020 | Wubbels | G06N 20/00 |
| 2016/0275413 A1 | 9/2016 | Shi et al. | |
| 2019/0122078 A1* | 4/2019 | Ura | G06N 20/20 |
| 2019/0122141 A1* | 4/2019 | Zhen | G06N 3/04 |
| 2019/0236487 A1* | 8/2019 | Huang | G06N 20/00 |

(Continued)

OTHER PUBLICATIONS

On the Difficulty of DNN Hyperparameter Optimization Using Learning Curve Prediction (Year: 2018).*

(Continued)

*Primary Examiner* — Ying Yu Chen
*Assistant Examiner* — Em N Trieu
(74) *Attorney, Agent, or Firm* — KDW Firm PLLC

(57) ABSTRACT

Systems, methods, articles of manufacture, and computer program products to: train a prediction model using a machine learning process, the prediction model configured to estimate whether further application of a hyperparameter tuning technique will cause an improvement in at least one of the hyperparameters; select the hyperparameters using the tuning technique; apply the prediction model to determine if further adjustment of the hyperparameters is likely to improve the success metric; and terminate the tuning technique when: accuracy of the prediction model in predicting improvement in a hyperparameter is above a predetermined accuracy threshold, and the prediction model predicts that further application of the tuning technique will not result in an improvement to the hyperparameter; or the accuracy of the prediction model in predicting improvement in the parameter is below the predetermined accuracy threshold, and an accuracy of hyperparameter adjustment is determined to be below a predetermined adjustment accuracy threshold.

20 Claims, 18 Drawing Sheets

(56) References Cited

U.S. PATENT DOCUMENTS

| | | | |
|---|---|---|---|
| 2020/0019603 A1* | 1/2020 | Zorn | G06N 3/04 |
| 2020/0057958 A1* | 2/2020 | Moore | G06N 20/00 |
| 2020/0097847 A1* | 3/2020 | Convertino | G06F 11/3447 |
| 2020/0226496 A1* | 7/2020 | Basu | G06N 5/01 |

OTHER PUBLICATIONS

Hutter et al., "Sequential Model-Based Optimization for General Algorithm Configuration", University of British Columbia [online], 15 pages. Retrieved from Internet URL: <http://www.cs.ubc.ca/labs/beta/Projects/SMAC/papers/11-LION5-SMAC.pdf>. Retrieved on Feb. 18, 2020.

Joseph, R., "Grid Search for Model Tuning", Toward Data Science [online], 8 pages. Retrieved from Internet URL: <https://towardsdatascience.com/grid-search-for-model-tuning-3319b259367e?gi=a1ffe6ff0cc6>, Dec. 29, 2018. Retrieved on Feb. 18, 2020.

Toal et al., "Kriging Hyperparameter Tuning Strategies", University of Southhampton, UK [online], 25 pages. Retrieved from Internet URL: <http://www.soton.ac.uk/~nwb/lectures/AppsCFD/Kriging_Hyperparameter_Tuning_Strategies.pdf. Retrieved on Feb. 18, 2020.

Santhosh Hari, "Simulated Annealing", Santhoshhari.github.io [online], 4 pages. Retrieved from Internet URL: <https://santhoshhari.github.io/simulated_annealing/>. Retrieved on Feb. 18, 2020.

* cited by examiner

U.S. 11,809,968 B2

CONTROL OF HYPERPARAMETER TUNING BASED ON MACHINE LEARNING

TECHNICAL FIELD

Embodiments herein generally relate to computing platforms, and more specifically, to controlling the optimization of hyperparameters for an artificial intelligence (AI) model.

BACKGROUND

It has become commonplace to use AI models to perform any of a wide variety of functions. However, while some aspects of preparing an AI model to perform a function have become relatively well defined and understood, other aspects may require time consuming experimentation. For example, while there may be considerable information available concerning the most effective type of AI model to use for performing some functions (e.g., visual recognition), there may be a relative lack of such information available for other functions such that the determination of which type of AI model to use may require some degree of trial and error experimentation. Additionally, even where the type of AI model that is deemed to be best for use in performing a particular function may be well known, there may be a relative lack of information available concerning tuning various configuration aspects of an implementation of that AI model to perform that function. Such configuration aspects are often referred to as "hyperparameters" to distinguish them from the parameters that are learned by training. It may be that deriving the hyperparameters may also require some degree of time consuming trial and error experimentation.

SUMMARY

Embodiments disclosed herein provide systems, methods, articles of manufacture, and computer-readable media for the use of machine learning to control the tuning of hyperparameters of an AI model. In one example, an apparatus includes a non-transitory computer-readable medium storing a set of hyperparameters for an AI model, the hyperparameters configured to be adjusted according to a hyperparameter selection technique based on one or more parameters, and a processor. The processor is configured to train a prediction model using a machine learning process, the prediction model configured to estimate whether further application of the hyperparameter selection technique will cause an improvement in at least one of the hyperparameters; select the hyperparameters using the hyperparameter selection technique; and apply the prediction model to determine if further adjustment of the hyperparameters is likely to improve the success metric. The processor is further configured to terminate the hyperparameter selection technique when either: an accuracy of the prediction model in predicting improvement in at least one of the hyperparameters is above a predetermined accuracy threshold, and the prediction model predicts that further application of the hyperparameter selection technique will not result in an improvement to the hyperparameter; or the accuracy of the prediction model in predicting improvement in the hyperparameter is below the predetermined accuracy threshold, and an accuracy of hyperparameter adjustment is determined to be below a predetermined adjustment accuracy threshold.

DETAILED DESCRIPTION

Figure 1:
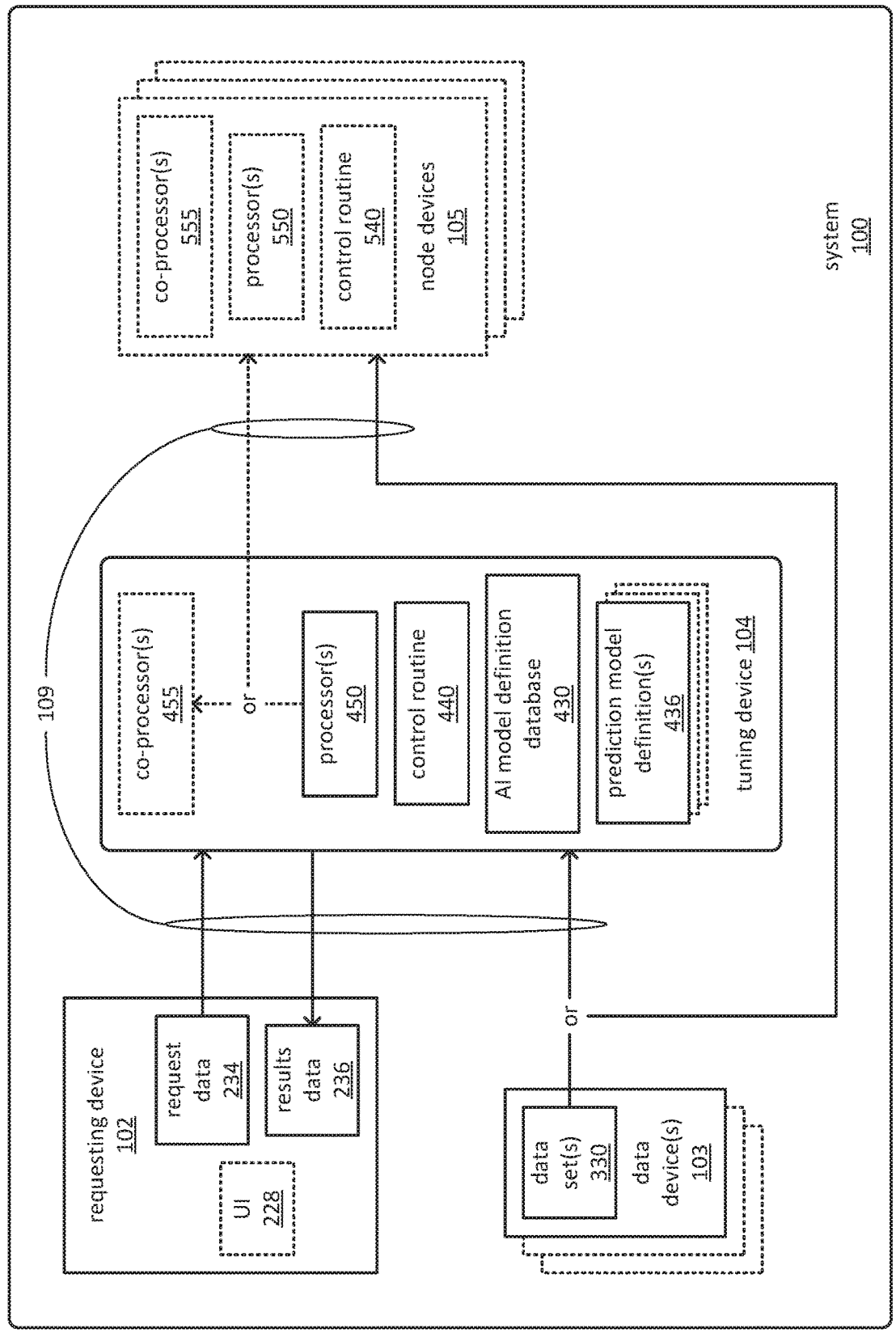
FIG. 1 illustrates an embodiment of a system that tunes hyperparameters of an AI model.

Embodiments disclosed herein use machine learning to control the tuning of hyperparameters of an AI model specified to be used to perform a particular function. Generally, as the tuning of hyperparameters for the AI model begins, evaluations of the results of initial iterations of such tuning may be used to train one or more prediction models. During subsequent iterations of such tuning, the one or more prediction models may then be used to generate predictions concerning the efficacy of subsequent iterations of such tuning as part of determining when to cease such tuning.

The performance of iterations of tuning of hyperparameters for an AI model may begin in response to the receipt of a request to do so, wherein the request may specify the AI model, the hyperparameter search space, a single set of hyperparameters that define a starting point within the hyperparameter search space, a data set to be used in training and/or testing each instance of the AI model that is used to test a single set of hyperparameters, the evaluation criteria to be used in evaluating the results of each test of a single set of hyperparameters, and/or the one or more prediction models to be used in generating predictions. The function that the AI model is to perform may be any of wide variety of functions for which an output is to be generated in response to data values provided to the inputs of the AI model. The AI model and/or each of the one or more prediction models may each employ any of a wide variety of types of machine learning techniques.

For each iteration of performance of the tuning of hyperparameters for the AI model, a set of the hyperparameters that fall within the hyperparameter search space may be generated using any of a variety of techniques, including randomly. For each single set of hyperparameters that is to be tested, an instance of the AI model may be instantiated based on that single set, and that instance of the AI model may then be trained using the data set. That instance of the AI model may then be tested using the data set, and the results of the testing may be evaluated based on the evaluation criteria. Such an evaluation may entail the generation of a metric from the results of the testing, followed by the comparison of the metric to one or more thresholds. During a training mode, as the initial iterations of the tuning of hyperparameters are performed, the one or more prediction models may be trained based on each set of hyperparameters that is tested and the corresponding evaluation of the results of the testing thereof based on the evaluation criteria.

Following the training mode, the one or more prediction models may then be used in a prediction mode to make predictions concerning what the results of the testing of each set of hyperparameters will be. The predictions may be employed to determine whether or not to proceed with consuming the time, processing resources, storage resources and/or other resources necessary to test each set of hyperparameters. Where a determination is made to proceed with the testing of a set of hyperparameters, the evaluation of the results of that testing may be used to determine the degree of success of the one or more prediction models in making the predictions on which such determinations are based. In some embodiments, where the degree of success falls below a predetermined threshold, the training mode may be re-entered as the one or more prediction models may be further trained based on more sets of hyperparameters and corresponding evaluations of the results of the testing thereof.

In some embodiments, advantage may be taken of the availability of processing resources and/or storage resources that enable the generation and/or testing of batches of multiple sets of hyperparameters to be performed in parallel. In such embodiments, determinations may be made (based on predictions made by the one or more prediction models) of whether to proceed with the testing of batches of multiple sets of hyperparameters, instead of whether to proceed with the testing of individual sets of hyperparameters.

Advantageously, embodiments disclosed herein enable time, processing resources, storage resources and/or other valuable resources to be utilized more efficiently by using the learned history of the results of earlier testing of sets of hyperparameters for a specified AI model within a specified hyperparameter search space as a basis for determining whether or not there is efficacy to continuing with further testing of hyperparameters. In this way, such resources may be better utilized for the testing of hyperparameters for a different AI model and/or within a different hyperparameter search space. Also advantageously, such use of such a learned history is able to be scaled up to be used across numerous processing cores within a single device and/or across numerous interconnected devices.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 depicts a schematic of an exemplary system 100 for the tuning of hyperparameters of an AI model, consistent with disclosed embodiments. As shown, the system 100 may include a requesting device 102, one or more data devices 103, a tuning device 104, and/or one or more node devices 105. The requesting device 102 may provide the tuning device 104 with request data 234 conveying details of a request to tune the hyperparameters of an AI model. The one or more data devices 103 may provide the tuning device 104 with a training data and/or testing data for use in such tuning. As will be explained in greater detail, in some embodiments, the tuning device 104 may employ its own processing and/or storage resources to perform such tuning. However, in other embodiments, the tuning device 104 may distribute portions of the performance of such tuning among the one or more node devices 105 to employ the processing and/or storage resources the one or more node devices 104 to perform those portions of such tuning.

As also shown, the devices 102, 103, 104 and/or 105 may be interconnected via a network 109, by which these devices may exchange information associated with the requested turning of hyperparameters as just described. However, one or more of these devices may also exchange other data entirely unrelated to such tuning with each other and/or with still other devices (not shown) via the network 109. In various embodiments, the network 109 may be a single network possibly limited to extending within a single building or other relatively limited area, a combination of connected networks possibly extending a considerable distance, and/or may include the Internet. The network 109 may be based on any of a variety (or combination) of communications technologies by which signals may be exchanged, including and without limitation, wired technologies employing electrically and/or optically conductive cabling, and wireless technologies employing infrared, radio frequency or other forms of wireless transmission.

The requesting device 102 may provide a user interface (UI) 228 to an operator thereof by which the operator may specify various aspects of the AI model and/or of the hyperparameters thereof that are to be tuned. The requesting device 102 may then transmit, to the tuning device 104, the request data 234 in which such aspects are specified as part of providing the turning device 104 with the request for the performance of such tuning. Upon completion of the performance of such tuning, the requesting device 102 may receive results data 236 specifying whether the such tuning was successful, and if so, a set of the hyperparameters generated by such tuning.

The one or more data devices 103 may serve as the source of a data set 330 that may be used in training and then testing a separate instance of the AI model for each set of hyperparameters that is tested during the tuning of the hyperparameters. In embodiments in which the data set 330 is particularly large in size, the system 100 may include more than one of the data devices 103 to provide distributed storage of such data sets 330. The request data 234 may include an identifier of the data set 330 that is to be used during such tuning to enable the tuning device 104 and/or the one or more node devices 105 to directly retrieve the data set 330 from the one or more data devices 103 via the network 109.

Whether the data set 330 is retrieved by the tuning device 104 or the one or more node devices 105 may depend on whether portions of the performance of the tuning of the hyperparameters are distributed by the tuning device 104 among the one or more node devices 105. In embodiments in which the system 100 includes more than one of the node devices 104, those multiple node device 105 may be interconnected through the network 109 to form a distributed processing grid.

Each of these devices 102, 103, 104 and/or 105 may be representative of any type of computing device, such as a server, desktop computer, laptop computer, smartphone, virtualized computing system, compute cluster, portable gaming device, etc.

Figure 2:
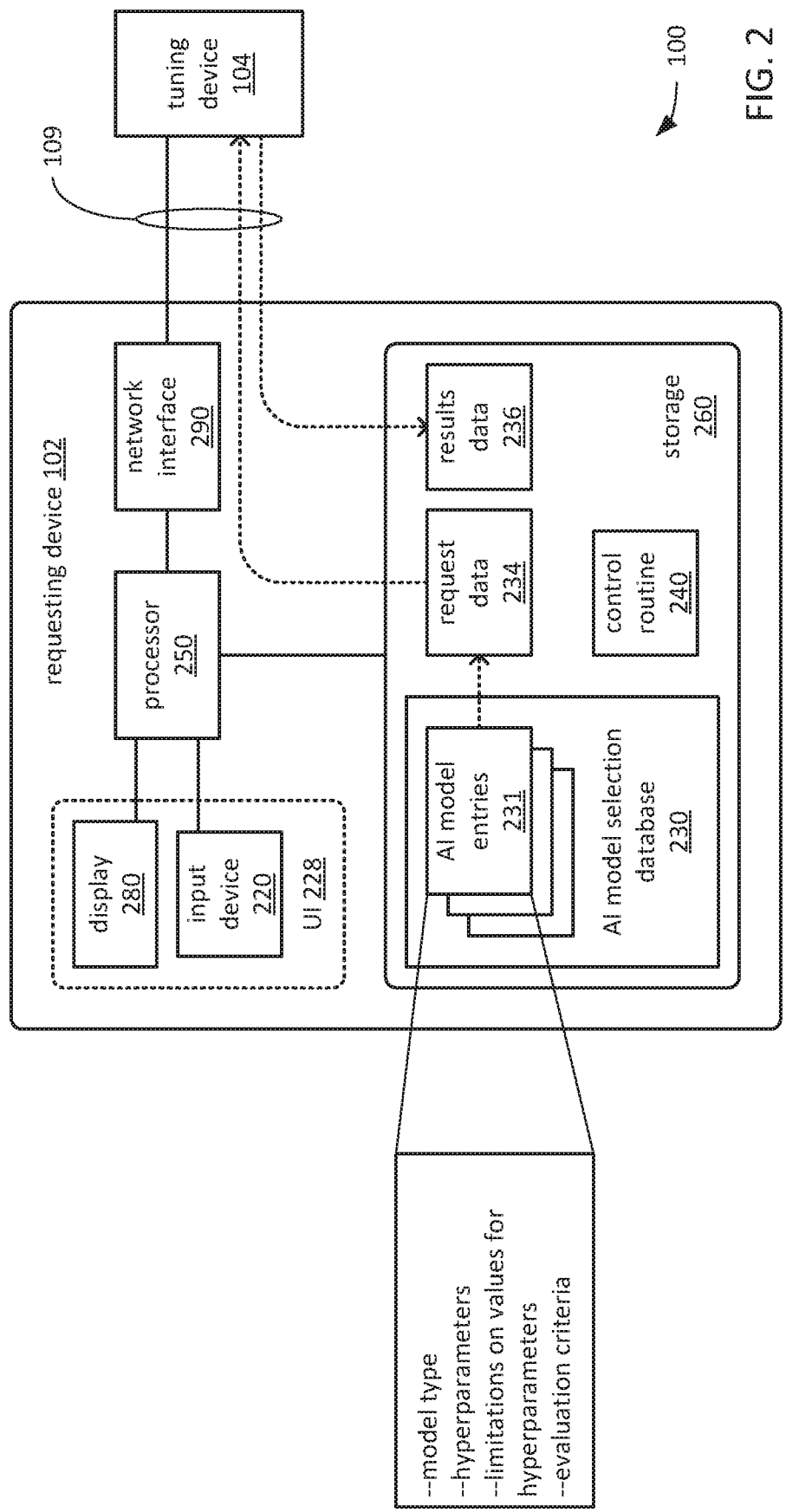
FIG. 2 illustrates an embodiment of a requesting device that specifies a type of AI model.

FIG. 2 depicts a schematic of an exemplary embodiment of the requesting device 102. As shown, the requesting device 102 may include a processor 250, a storage 260, an input device 220, a display 280 and/or a network interface 290 to couple the requesting device 102 to a network, such as the network 109. The storage 260 may store the request data 234, the results data 236, an AI model selection database 230 and/or a control routine 240. The control routine 240 may include executable instructions operable on the processor 250 to cause the processor 250 to implement logic to perform various functions.

The AI model selection database 230 may include multiple AI model entries 231. Each entry 231 may correspond to a single AI model, and may include indications of various details of the corresponding AI model, such as a specification of what hyperparameters are associated with the corresponding AI model and/or limits of the range or set of values for one or more of those hyperparameters. Each of the AI models that corresponds to one of the entries 231 may be any of a variety of types of machine learning model, including and not limited to, neural networks of various types, capsule networks based on capsules of multiple artificial neurons, learning automata based on stochastic matrices, evolutionary algorithms based on randomly generated code pieces, etc.

The hyperparameters associated with each AI model may specify any of a variety of upper and/or lower boundaries on the size of various aspects of the configuration thereof, and/or still other aspects of the configuration thereof. By way of example, the hyperparameters for an implementation of a particular type of neural network may include the overall quantity of artificial neurons, the quantity of layers of artificial neurons, the quantity of sets of training values used in training, the activation function(s) of the artificial neurons, weights and/or biases associated with the activation function(s), etc.

In executing the control routine 240, the processor 250 may be caused to operate the display 280 and the input device 220 to provide the UI 228 in which a listing of AI models drawn from the entries 231 may be presented to an operator of the requesting device 102 from which to select the AI model for which hyperparameters are to be tuned. Upon selecting the AI model, the processor 250 may be further caused to present the operator with indications of what hyperparameters are associated with that AI model for being tuned, and/or indications of the limits of the range or set of values for one or more of them. In this way, the operator may be provided with an indication of the full extent of the available hyperparameter search space to enable the operator to specify a portion thereof as the hyperparameter search space that is to be covered during the tuning of the hyperparameters. Such a presentation may also enable the operator to specify the initial set of hyperparameters that define the starting point within the specified hyperparameter search space at which the tuning of the hyperparameters is to begin.

In some embodiments, each of the entries 231 of the AI model selection database 230 may also specify one or more evaluation criteria to be used in evaluating sets of hyperparameters during the tuning thereof, and/or to be used in determining when to cease such tuning. In some embodiments, the evaluation criteria may include a specified threshold of performance that is to be met by a metric derived from an evaluation of the outputs of the AI model, directly, such as a degree of accuracy in performing a particular function. However, in other embodiments, the evaluation criteria may include a specified threshold of a post-AI function into which the AI model provides its outputs as inputs. Such a post-AI function may, in turn, have one or more outputs that are desired to be minimized, maximized and/or generated to be as close as possible to a predetermined value. Thus, in such other embodiments, the evaluation criteria may include a specified threshold by which, for example, an output generated by a post-AI function from the outputs of the AI model is to be minimized, such as an error value, a value quantifying noise, a value quantifying a loss, etc.

Following the selection of the AI model and/or the specification of various other aspects of the tuning of the hyperparameters for the AI model, the processor 250 may be caused to operate the network interface 290 to transmit the request for the performance of such tuning to the tuning device 104 via the network 109, including the transmission of the request data 234 conveying such information.

Figure 3:
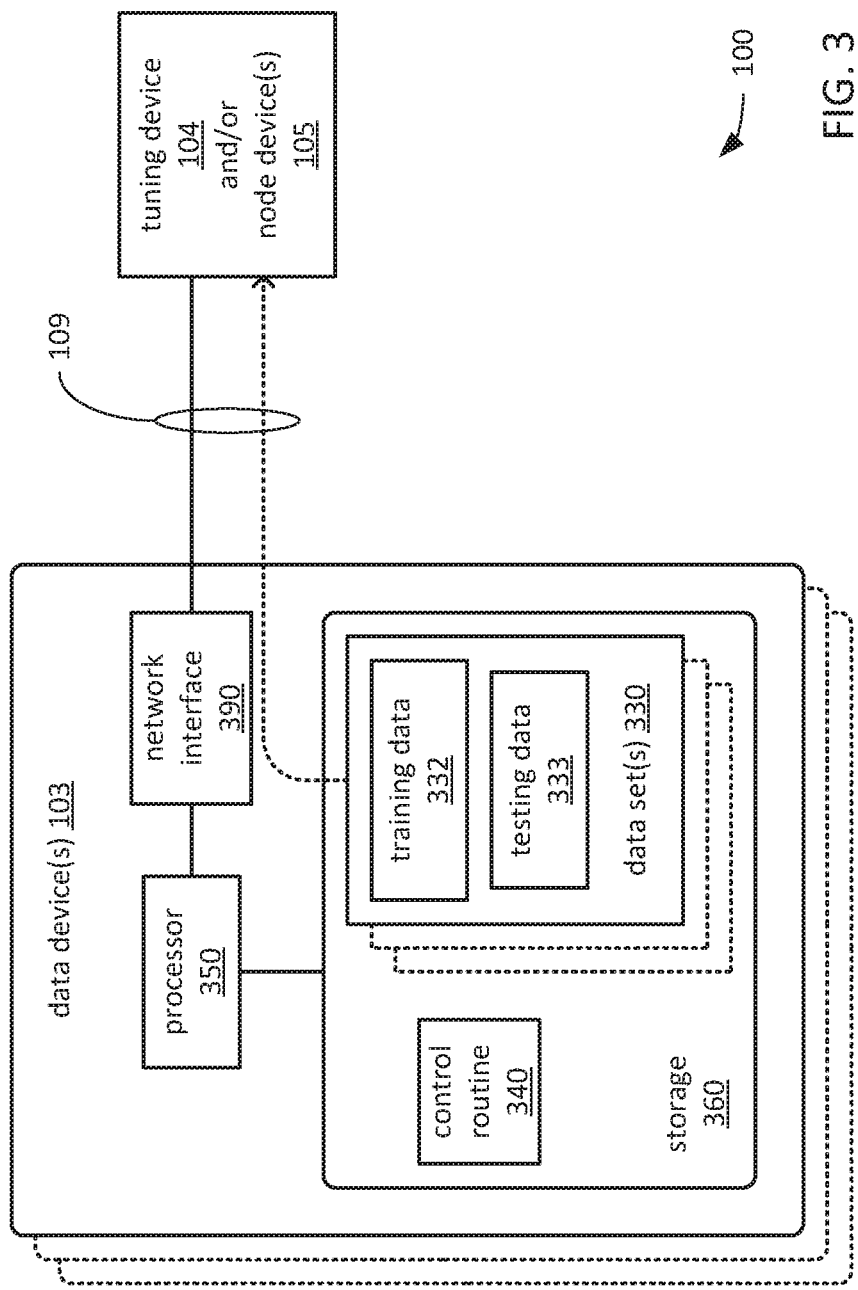
FIG. 3 illustrates an embodiment of a data device that provides training and testing data.

FIG. 3 depicts a schematic of an exemplary embodiment of each of the one or more data devices 103. As shown, each of the one or more data devices 103 may include a processor 350, a storage 360 and/or a network interface 390 to couple the data device 103 to a network, such as the network 109. The storage 360 may store the one or more data sets 330 and/or a control routine 340. The control routine 340 may include executable instructions operable on the processor 350 to cause the processor 350 to implement logic to perform various functions.

Each of the one or more data sets 330 may include any of a wide variety of types of data associated with any of a wide variety of subjects. By way of example, each data set 330 may include scientific observation data concerning geological and/or meteorological events, or from sensors employed in laboratory experiments in areas such as particle physics. By way of another example, each data set 330 may include indications of activities performed by a random sample of individuals of a population of people in a selected country or municipality, or of a population of a threatened species under study in the wild.

In some embodiments, each of the one or more data sets 330 may include specifically designated training data 332 by which each instance of the AI model is to be trained during the tuning of the hyperparameters, and/or specifically designated testing data 333 by which each such instance of the AI model is to be tested. In other embodiments, such a division of the data set 330 used in such tuning may not be performed until such tuning is performed.

Execution of the control routine 340 may cause the processor 350 to operate the network interface 390 to receive requests to store data sets 330 received from other devices via the network 109, and/or requests to retrieve and provide data sets 330 to other devices. More specifically, in embodiments in which the system 100 includes just one of the data device 103, the processor 350 may store entire data sets 330 within the single data device 103, and/or retrieve an entire data set 330 in response to a request received via the network 109 to provide that data set 330. Alternatively, in embodiments in which the system 100 includes more than one of the data device 103, the processors 350 of the multiple data devices 103 may cooperate via the network 109 to coordinate the division of data sets 330 into portions for storage across the multiple data devices 103, and/or to cooperate via the network 109 to coordinate the retrieval and combining of portions of a data set 330 in response to a response to such a request to provide that data set 330.

Figure 4:
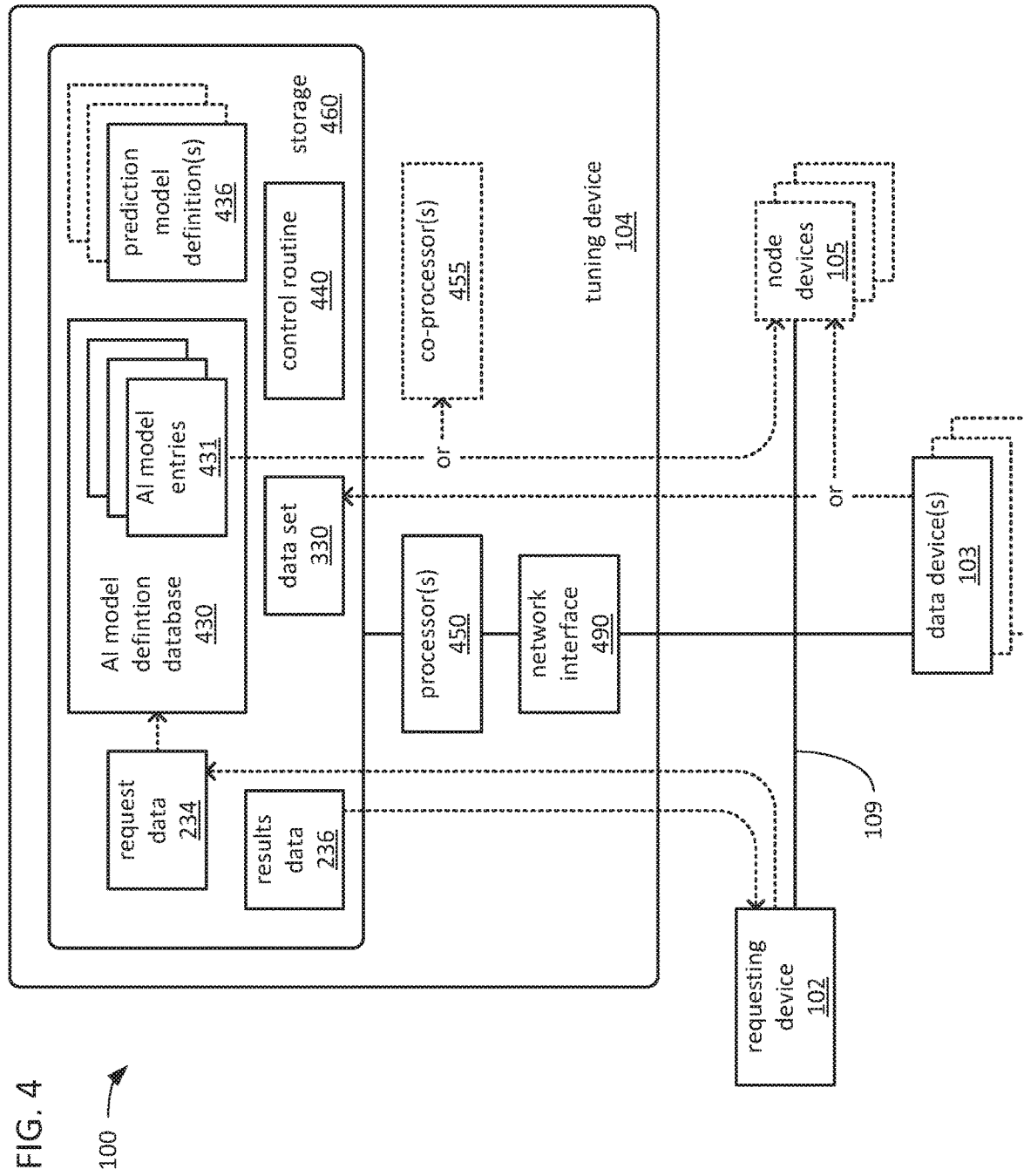
FIG. 4 illustrates an embodiment of a tuning device that tunes hyperparameters of an AI model.

FIG. 4 depicts a schematic of an exemplary embodiment of the tuning device 104. As shown, the tuning device 104 may include one or more processors 450, one or more co-processors 455, a storage 460, and/or a network interface 490 to couple the tuning device 104 to a network, such as the network 109. The storage 460 may store the request data 234, the results data 236, the data set 330, an AI model definition database 430, one or more prediction model definitions 436, and/or a control routine 440. The control routine 440 may include executable instructions operable on the one or more processors 450 to cause at least one thereof to implement logic to perform various functions.

In embodiments in which the tuning device 104 includes the one or more co-processors 455, the one or more co-processors 455 may differ in processing architecture from the one or more processors 450 in a manner that is deemed to make the one or more co-processors 455 more amenable for use in implementing multiple instances of the AI model. More specifically, in some embodiments, each of the one or more co-processors 455 may be a graphics processing unit (GPU) or other type of processing unit that incorporates a relatively large quantity of relatively simple processing cores that enable a highly parallelized performance of relatively simple functions. Such highly parallelized performances of relatively simple functions may enable, for example, a more efficient software-based implementation of numerous neurons of a neural network or of a capsule network. Alternatively, such highly parallelized performances of relatively simple functions may enable highly parallelized performances of computations involving the stochastic matrices of an implementation of learning automata or involving the randomly generated code pieces of an evolutionary algorithm.

Alternatively, in other embodiments in which the tuning device 104 incorporates the one or more co-processors 455, each of the one or more co-processors 455 may be a neuromorphic processing device or other type or processing device that at least partially implements artificial neurons as hardware components (e.g., such as a configurable array of memristors, not specifically shown). Each of such hardware components implementing at least a portion of an artificial neuron may incorporate dedicated memory components to store indications of weights, biases, an activation function, and/or connections to inputs and/or outputs of other hardware components that also at least partially implement other artificial neurons. Such neuromorphic devices may be capable of enabling the faster instantiation, training and/or testing of instances of the AI model.

The AI model definition database 430 may include multiple AI model entries 431. Each entry 431 may correspond to a single AI model, and may include various pieces of information needed to enable the implementation of the corresponding AI model, including and not limited to, indications of various configuration parameters, a copy of configuration data that may be used to directly program one or more neuromorphic devices (e.g., the one or more co-processors 455), or executable instructions that are operative on at least one of the one or more processors 450 to directly implement the corresponding AI model in software-based manner.

Each one of the one or more prediction model definitions 436 may similarly correspond to a single prediction model, and may similarly include various pieces of information needed to enable the implementation of the corresponding prediction model. Unlike the AI model that may be instantiated a relatively large number of times to enable the testing of a corresponding relatively large number of different sets of hyperparameters, each of the one or more prediction models may be implemented just once, and those single implementations of each of the one or more prediction models may remain instantiated throughout the performance of tuning of the hyperparameters of the AI model.

Figure 5:
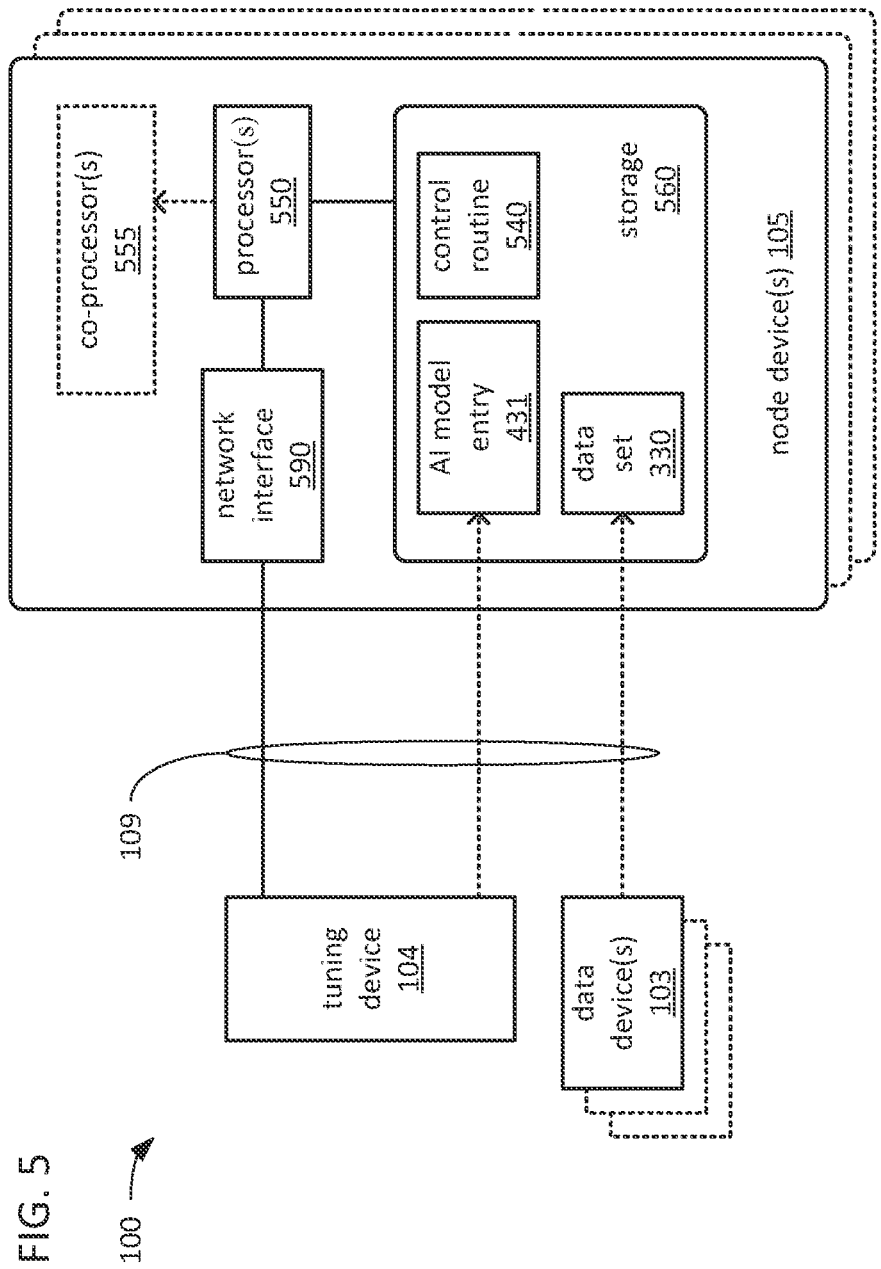
FIG. 5 illustrates an embodiment of a node device that performs a portion of tuning of hyperparameters of an AI model.

FIG. 5 depicts a schematic of an exemplary embodiment of each of the one or more node devices 105 that may be included in some embodiments of the system 100 in which the one or more node devices 105 are employed in performing at least a portion of the tuning of the hyperparameters of the AI model. As shown, each of the one or more node devices 105 may include one or more processors 550, one or more co-processors 555, a storage 560 and/or a network interface 590 to couple the node device 105 to a network, such as the network 109. The storage 560 may store the data set 330 specified in the request data 234 (FIG. 1), a copy of the AI model entry 431 retrieved by the processor(s) 450 (FIG. 4) from the AI model definition database 430 (FIG. 4), and/or a control routine 540. The control routine 540 may include executable instructions operable on the processor(s) 550 to cause the processor(s) 550 to implement logic to perform various functions.

Similar to the tuning device 104, in embodiments in which the one or more node devices 105 include the one or more co-processors 555, the one or more co-processors 555 may similarly differ in processing architecture from the one or more processors 550 in a manner that is deemed to make the one or more co-processors 555 more amenable for use in implementing multiple instances of the AI model. More specifically, in some embodiments, each of the one or more co-processors 455 may be a GPU, a neuromorphic device, etc.

Referring to both FIGS. 4 and 5, execution of the control routine 440 by at least one of the one or more processors 450 may cause the processor(s) 450 to operate the network interface 490 to monitor for, and to receive, the request for the performance of tuning of the hyperparameters of the AI model, including the request data 234 that may specify the AI model, the hyperparameter search space, the starting point within that space, and/or the data set 330 to be retrieved and used in the testing of sets of the hyperparameters. Following receipt of the request, the processor(s) 450 may retrieve the information needed to implement the AI model indicated in the request data 234 from the entry 431 that corresponds thereto in preparation for instantiating numerous instances of the AI model throughout multiple iterations of the tuning of its hyperparameters.

As previously discussed, in some embodiments, it may be the processing and/or storage resources of the tuning device 104 that are used in performing the iterations of tuning of the hyperparameters of the AI model, including the generating and/or testing of sets of hyperparameters, and/or the evaluation of the results of such testing. In such embodiments, the processor(s) 450 may operate the network interface 490 to retrieve the data set 330 identified in the request data 234 from the one or more data devices 103.

With the data set 330 and the information needed to implement the AI model retrieved, the processor(s) 450 may then generate one or more sets of hyperparameters for the AI model, and then instantiate a separate instance of the AI model based on and for each of those sets of hyperparameters. More specifically, it may be that the processor(s) 450 generate a "batch" of a predetermined quantity of sets of hyperparameters at a time, and instantiate a corresponding batch of instances of the AI model in which each instance of the AI model is based on a different one of the sets of hyperparameters in the batch of sets of hyperparameters. It may be that the processor(s) 450 are caused to configure and use the one or more co-processor(s) 455 in so instantiating each instance of the AI model in embodiments in which the tuning device 104 includes the one or more co-processors 455.

The processor(s) 450 may then employ a portion of the data set 330 that is designated as the training data to train each instance of the AI model. Following such training, the processor(s) 450 may then employ another portion of the data set 330 that is designated as the testing data to test each of the now trained instances of the AI model. Following such testing, the processor(s) 450 may use the evaluation criteria conveyed in the request data 234 to evaluate the results of the testing of each instance of the AI model. As previously discussed, in some embodiments, the evaluation of results of testing each instance of the AI model may entail evaluating the outputs of the instance of the AI model, directly. However, as also previously discussed, in other embodiments, the evaluation of the results of test each instance of the AI model may entail evaluating the output(s) of a post-AI function that generates its output(s) from the outputs of the instance of the AI model.

However, as also previously discussed, in other embodiments, it may the processing and/or storage resources of the one or more node devices 105 that are used in performing the iterations of tuning of the hyperparameters of the AI model, including testing of sets of hyperparameters of the AI model, and/or the evaluation of the results of such testing. In such other embodiments, the processor(s) 450 of the tuning device 104 may, initially, operate the network interface 490 to distribute the retrieved information from the entry 431 that corresponds to the AI model and/or from the request data 234 among the one or more node devices 105. Within each of the one or more node devices 105, execution of the control routine 540 may cause the processor(s) 550 to use the identifier of the data set 330 relayed thereto from the tuning device 104 to operate the network interface 590 to so retrieve the data set 330 from the one or more data devices 103.

The processor(s) 450 of the tuning device 104 may still generate the batches of sets of hyperparameters, and may then operate the network interface 490 to distribute individual sets of hyperparameters from each such batch or to distribute whole batches of sets of hyperparameters to each of the one or more node devices 105 via the network 109 to thereby enable the one or more node devices 105 to instantiate one or more corresponding instances of the AI model or to instantiate one or more corresponding batches of instances of the AI model at least partially in parallel. Within each of the one or more node devices 105, the processor(s) 550 of each may so instantiate one or more instances or batches of instances of the AI model, each based on a different set of hyperparameters received from the tuning device 104.

Within each of the one or more node devices 105, the processor(s) 550 may then employ a portion of the data set 330 that is designated as the training data to train each instance of the AI model. Following such training, the processor(s) 550 may then employ another portion of the data set 330 that is designated as the testing data to test each of the now trained instances of the AI model. Following such testing, the processor(s) 550 may use the evaluation criteria relayed to the one or more node devices 105 from the tuning device 104 to evaluate the results of the testing of each instance of the AI model. The processor(s) 550 of each of the one or more node devices 105 may then operate the network interface 590 thereof to transmit an indication of the results of the testing and/or of the evaluation(s) thereof to the tuning device 104.

As previously discussed, the one or more prediction models to be used in evaluating the efficacy of the testing of particular sets of hyperparameters and/or continuing the tuning of hyperparameters may, initially, be operated in a training mode during an initial quantity of iterations of the tuning of hyperparameters of the AI model. During such a training mode, sets of hyperparameters and their corresponding evaluations of the results of the testing thereof may be employed as training data to train the one or more prediction models. Such a training mode may continue for a predetermined period of time and/or through a predetermined number of iterations of the performance of the tuning of hyperparameters of the AI model.

Following completion of such a training mode, the one or more prediction models may then be operated in a prediction mode during which the one or more prediction models may be used to make, for each set of hyperparameters of each batch of hyperparameters, a prediction of whether the set of hyperparameters will likely be found through testing to improve the tuning of hyperparameters for the AI model so as to come closer to achieving a threshold specified in the evaluation criteria such that it may be deemed efficacious to proceed with using the time, as well as processing and/or storage resources to perform such testing of that set of hyperparameters. Such use of the one or more prediction models seeks to reduce the number of instances in which such resources are expended on testing sets of hyperparameters that are deemed unlikely to lead to any improvement in the tuning of hyperparameters for the AI model.

As will be explained in greater detail, various situations arising from the combination of evaluating testing results and/or of evaluating the accuracy of the predictions made by the one or more prediction models may lead the cessation of the tuning of hyperparameters of the AI model with either success in such tuning, or a determination that success in such tuning is not possible such that the further performance of such tuning is not deemed to be efficacious.

Figure 6A:
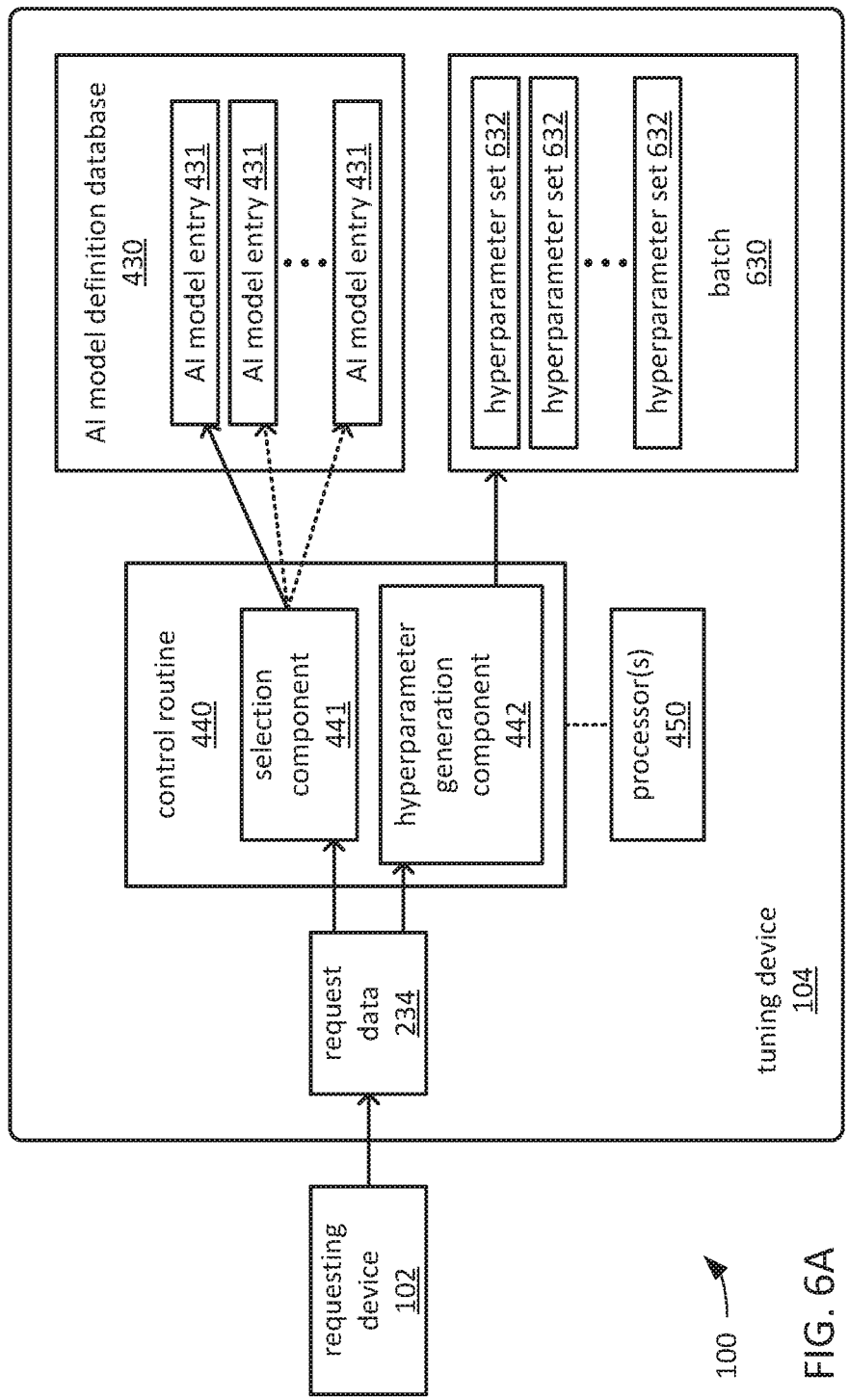
FIGS. 6A-6D, taken together, illustrate an embodiment of a performance of tuning of hyperparameters.
Figure 6B:
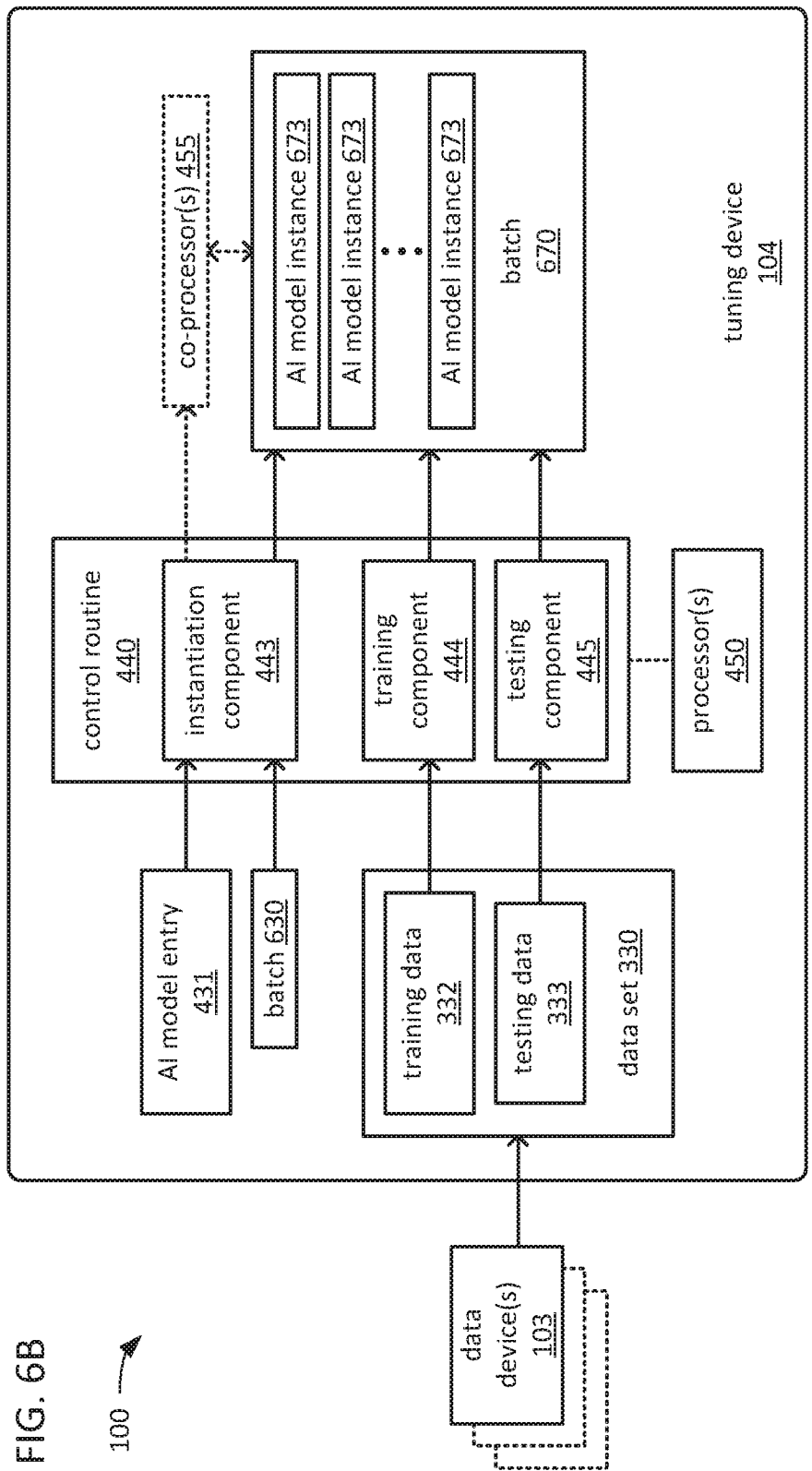
Figure 6C:
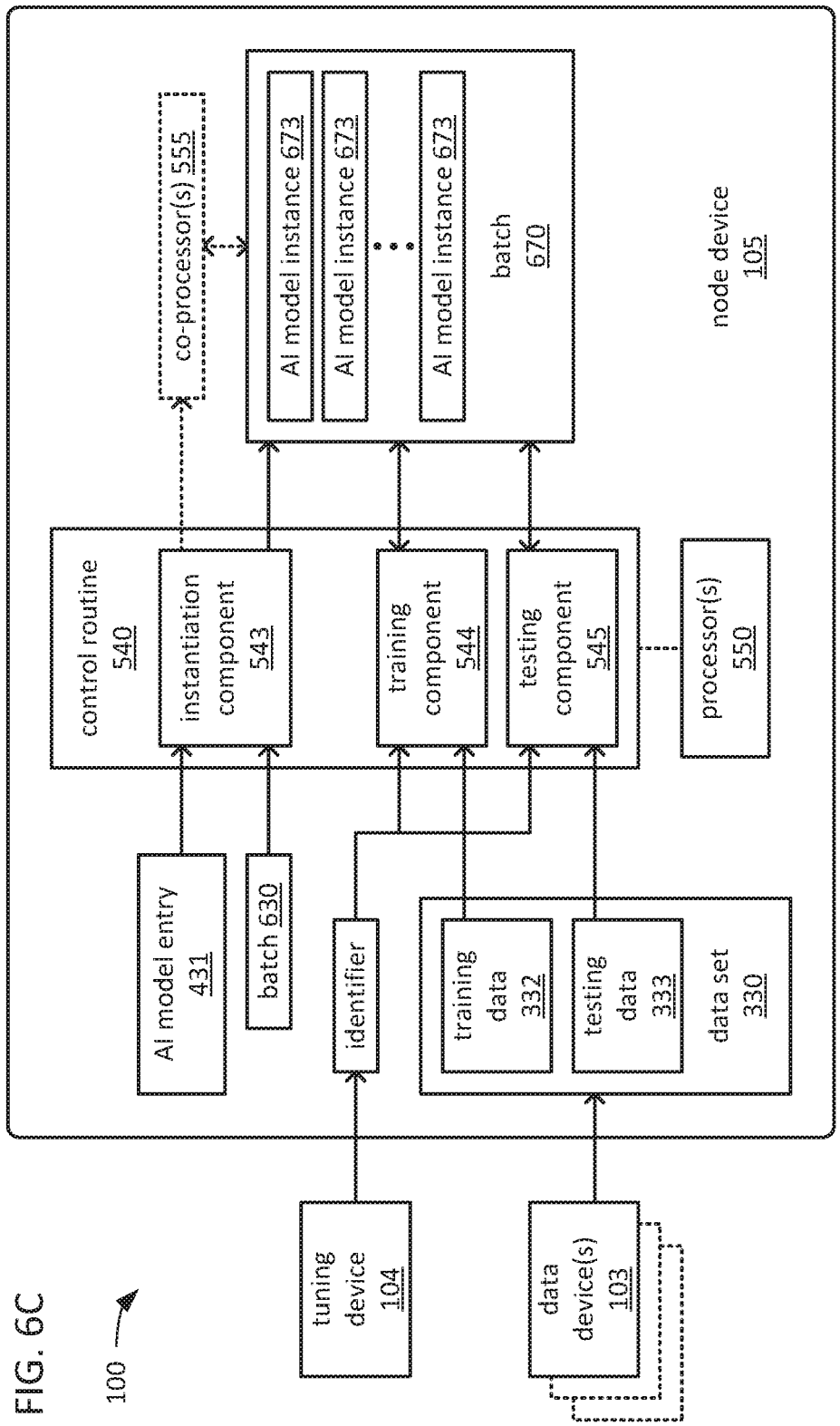
Figure 6D:
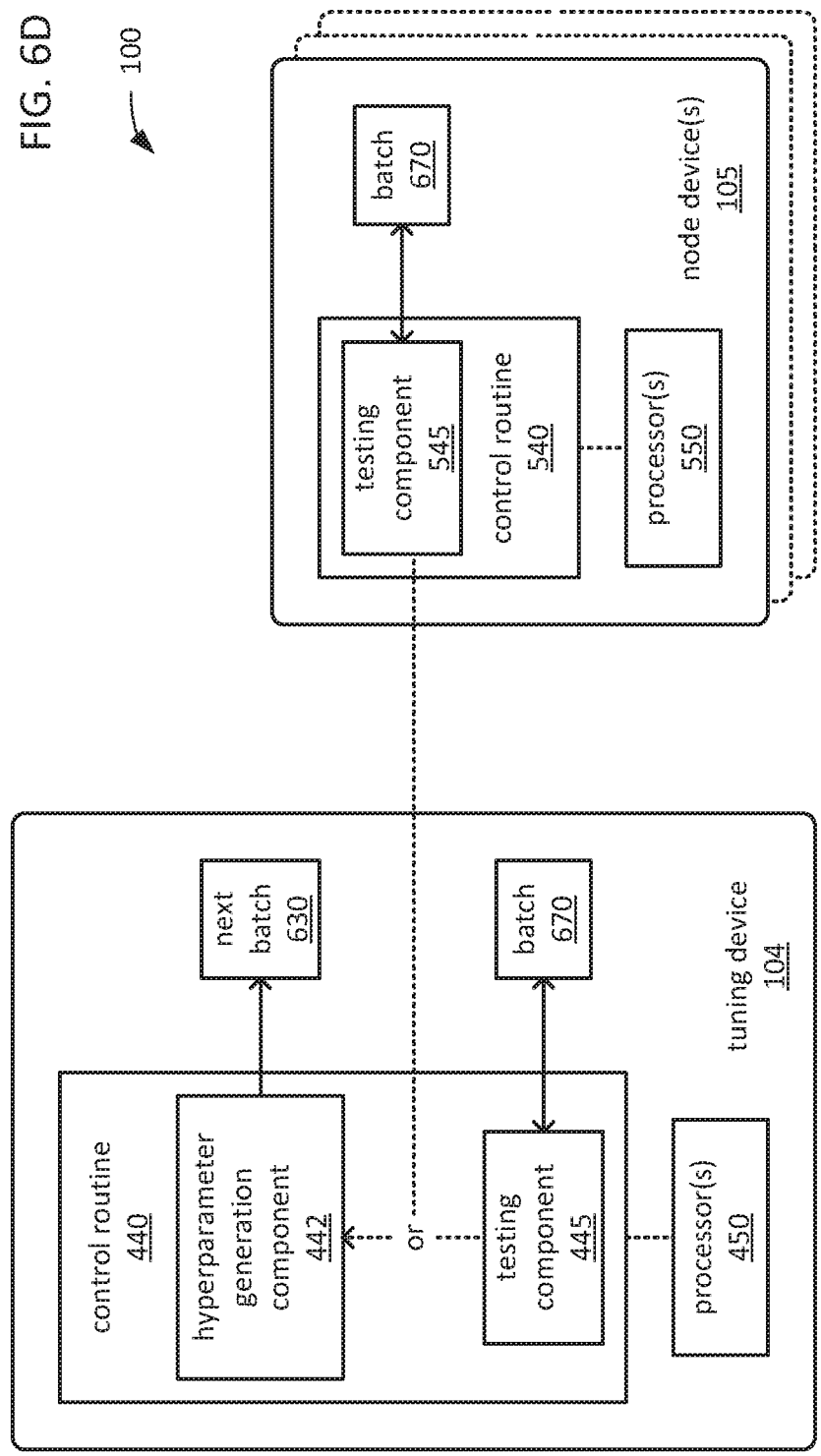

FIGS. 6A through 6D, taken together, illustrate an exemplary performance of tuning of hyperparameters of an AI model. FIG. 6A illustrates an example of preparations to perform iterations of tuning the hyperparameters. FIG. 6B illustrates an example of a performance of iterations of tuning the hyperparameters using processing and/or storage resources of an example of the tuning device 104. FIG. 6C illustrates an example of a performance of iterations of tuning the hyperparameters using processing and/or storage resources of an example one of the one or more node devices 105. FIG. 6D illustrates an example of employing the results of earlier iterations in generating more sets of hyperparameters for further iterations.

As shown in FIG. 6A, the control routine 440 may include a selection component 441 and/or a hyperparameter generation component 442, which may each be executed to implement logic to perform various operations as a result of execution of the control routine 440. In being so executed, the selection component 441 may operate the network interface 490 (FIG. 4) to monitor for, and to receive, a request for the performance of tuning of the hyperparameters of an AI model identified in the request data 234 that may be received as part of the request. The request data 234 may also specify the hyperparameter search space, the starting point within that space, and/or the data set 330 to be retrieved and used in the testing of sets of the hyperparameters. The selection component 441 may then retrieve the information needed to implement the AI model from the entry 431 that corresponds to the AI model. In also being executed, the hyperparameter generation component 442 may use the received indications of the hyperparameter search space and/or of the of the starting point within that search space as a basis for generating at least one batch 630 of multiple sets 632 of hyperparameters.

As shown in FIG. 6B, in at least embodiments in which the processing and/or storage resources of the tuning device 104 are used in performing the iterations of tuning of hyperparameters of the AI model, the control routine 440 may also include an instantiation component 443, a training component 444 and/or a testing component 445, which may each be executed to implement logic to perform various operations as a result of execution of the control routine 440. In being so executed, the instantiation component 443 may instantiate at least one batch 670 of instances 673 of the AI model in which each instance 673 of the AI model is based on a different one of the sets 632 of hyperparameters in the at least one batch 630 of sets 632 of hyperparameters. Following the instantiation of the at least one batch 670, the training component 444 may employ a portion of the data set 330 that is designated as the training data to train each of the instances 673 of the AI model. Following such training, the testing component 445 may employ another portion of the data set 330 that is designated as the testing data to test each of the now trained instances 673 of the AI model.

As shown in FIG. 6C, in at least embodiments in which the processing and/or storage resources of the one or more node devices 105 are used in performing the iterations of tuning of hyperparameters of the AI model, the control routine 540 may include an instantiation component 543, a training component 544 and/or a testing component 545, which may each be executed to implement logic to perform various operations as a result of execution of the control routine 540. As a comparison between the FIGS. 6B and 6C reveals, the components 443, 444 and 445 of the control routine 440 perform substantially similar functions as the components 543, 544 and 545 of control routine 540. In being so executed, the instantiation component 543 may instantiate at least one batch 670 of instances 673 of the AI model in which each instance 673 of the AI model is based on a different one of the sets 632 of hyperparameters in the at least one batch 630 of sets 632 of hyperparameters. Following the instantiation of the at least one batch 670, the training component 544 may employ a portion of the data set 330 that is designated as the training data to train each of the instances of instance 673 of the AI model. Following such training, the testing component 545 may employ another portion of the data set 330 that is designated as the testing data to test each of the now trained instances 673 of the AI model. The testing component 545 may then transmit an indication of the results to the tuning device 104.

Turning to FIG. 6D, regardless of whether the processing and/or storage resources of the tuning device 104 are used to perform the tuning of hyperparameters of the AI model, or the processing and/or storage resources of the one or more node devices 105 are so used, following the testing of the batch 670 of instances 673 (FIG. 6C) of the AI model by either of the testing components 445 or 545, the hyperparameter generation component 442 may employ indications of the results of such testing to guide its generation of a next batch 630 of sets 632 (FIG. 6A) of hyperparameters. As previously discussed, any of a wide variety of techniques for the generation of sets 632 of hyperparameters may be used, including and not limited to, at least some degree of pseudo-random generation of hyperparameter values. However, it is envisioned that the technique selected for use may, alternatively or additionally, employ the results of testing previously generated sets of hyperparameters in an effort to enable the achievement of some degree of improvement as ever newer batches 630 of sets 632 of hyperparameters are generated.

Figure 7A:
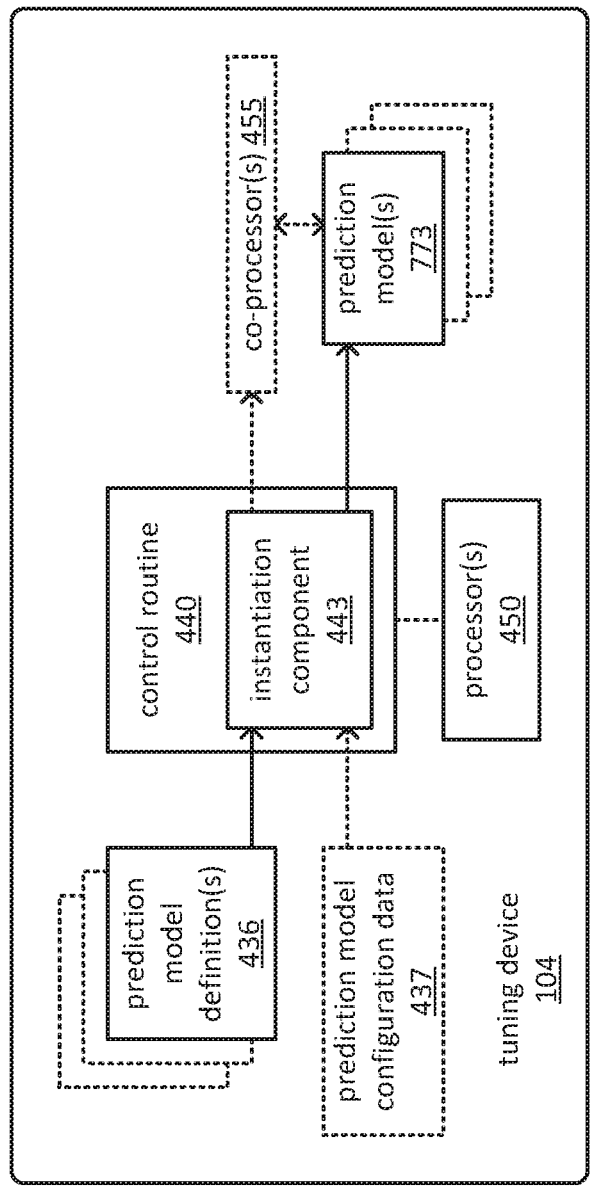
FIGS. 7A-C, taken together, illustrate an embodiment of control of a performance of tuning of hyperparameters.
Figure 7B:
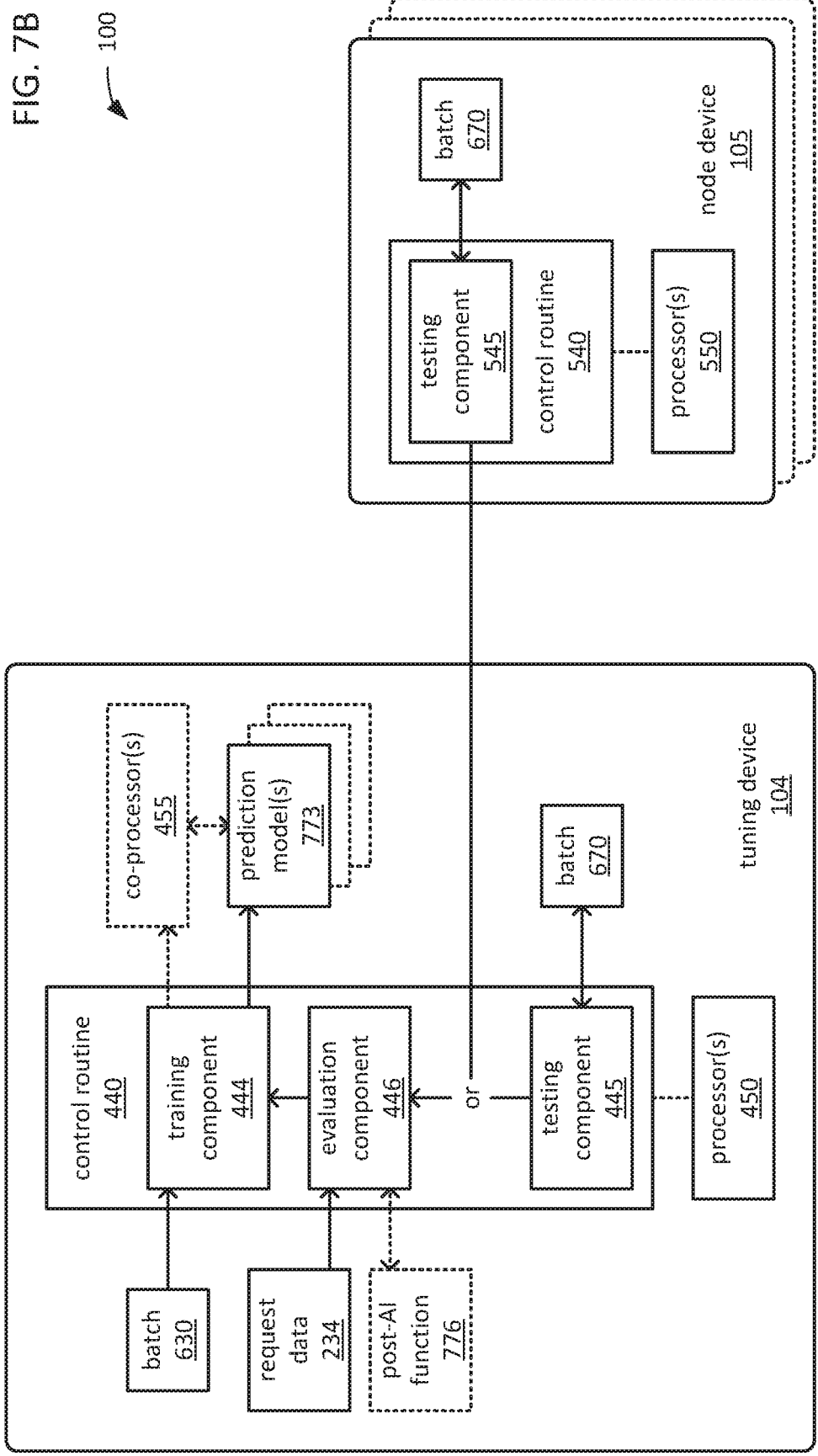
Figure 7C:
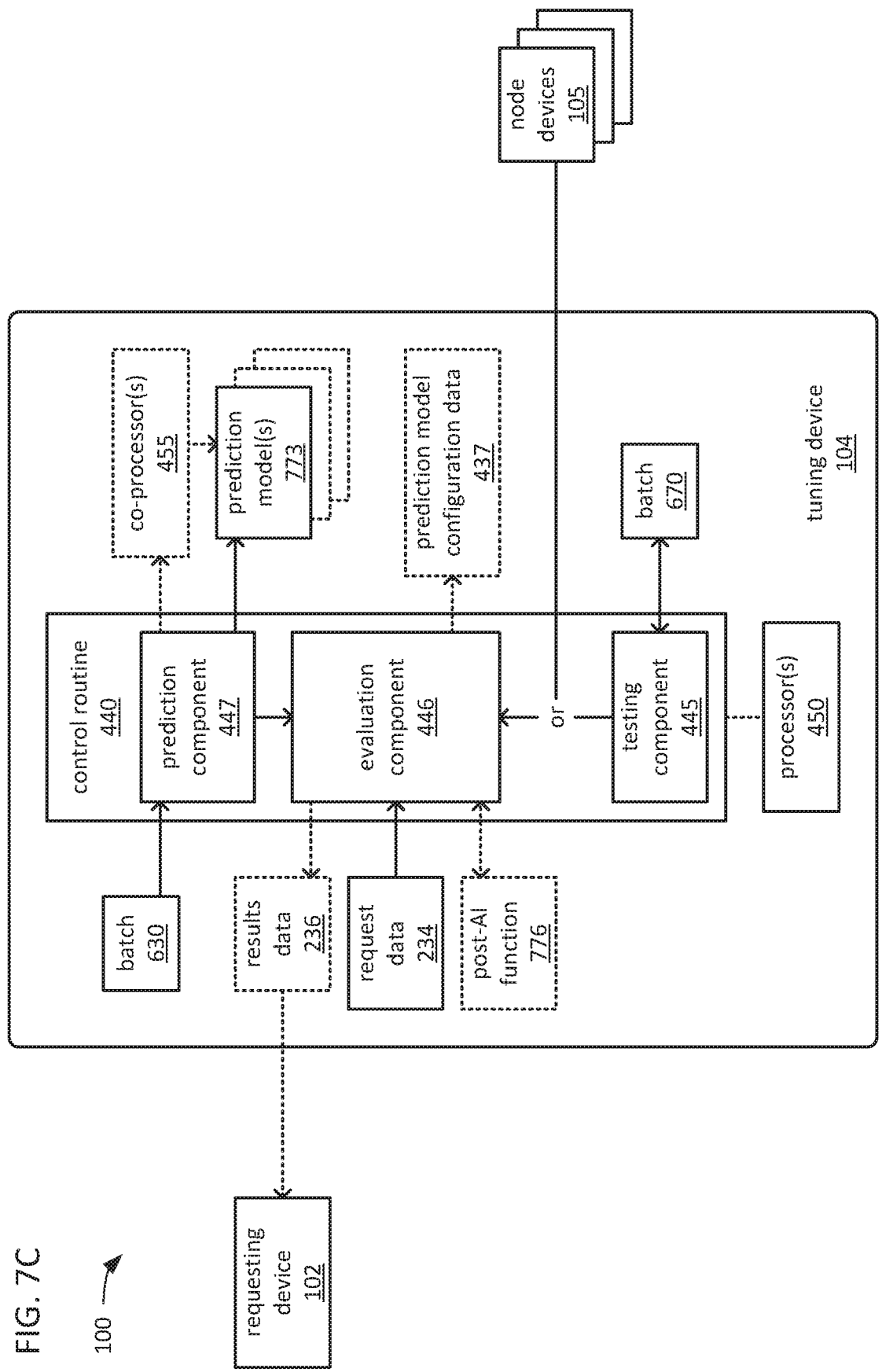
Figure 8A:
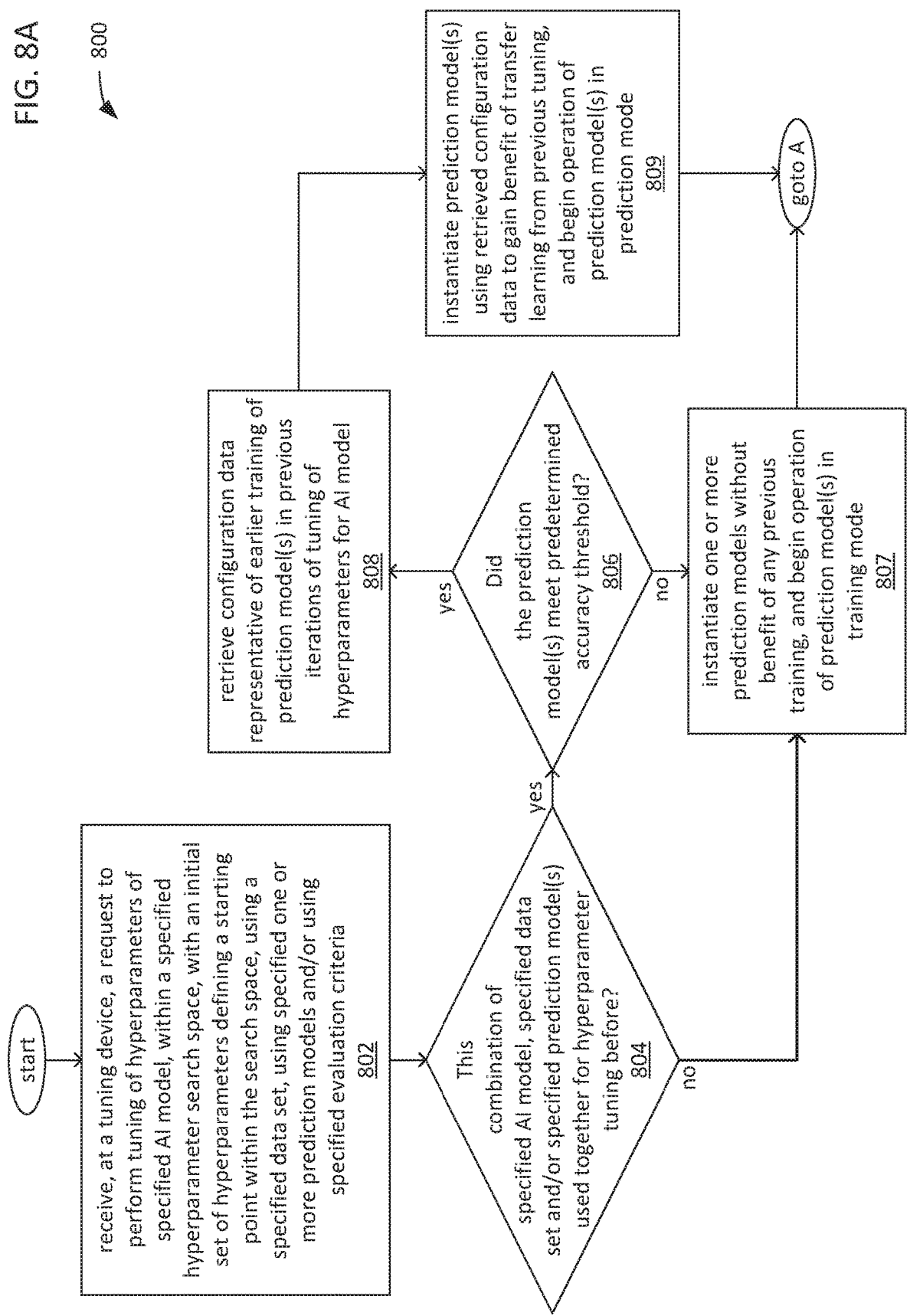
FIGS. 8A-8E, together, illustrate an embodiment of a first logic flow.
Figure 8B:
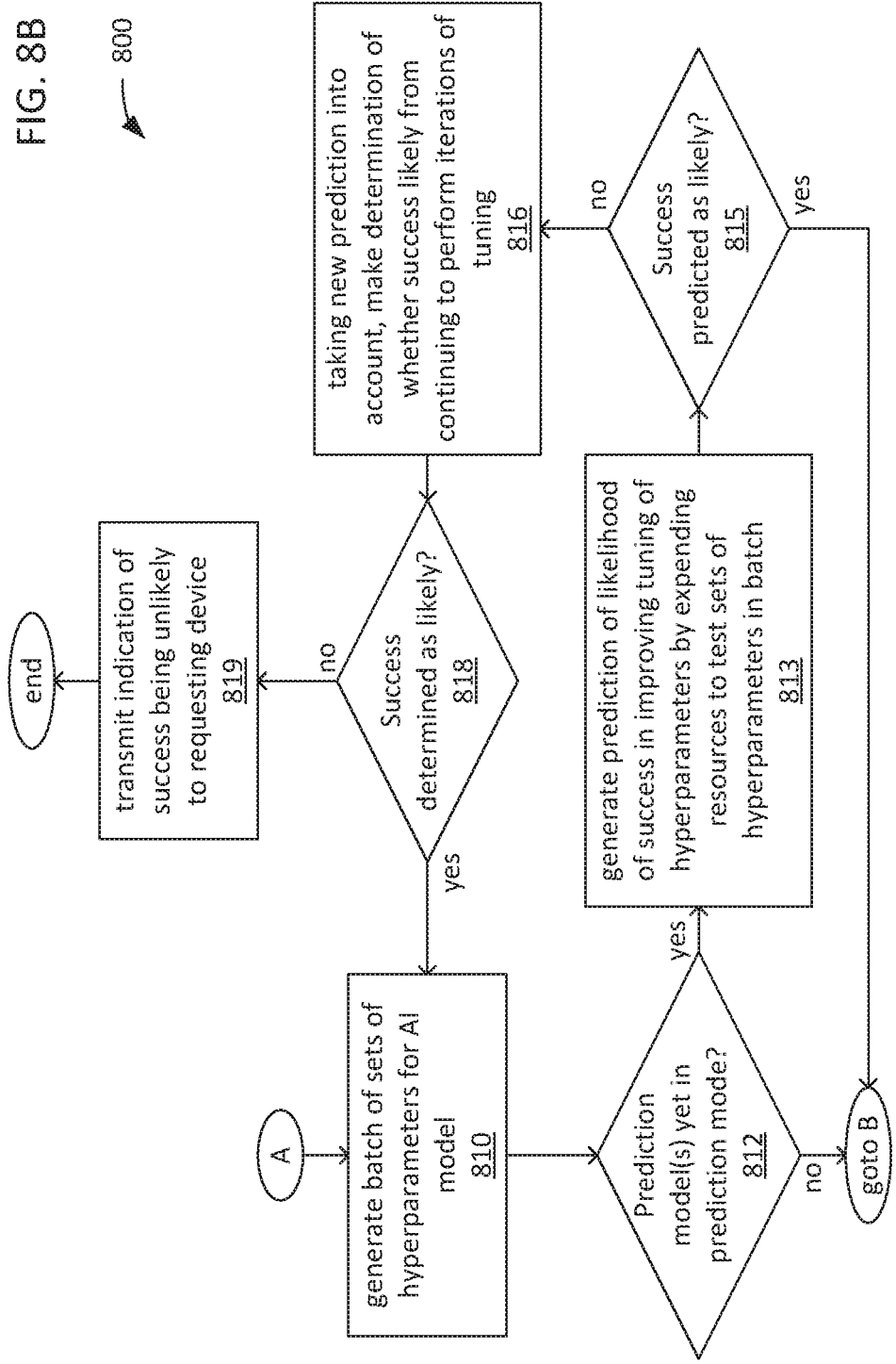
Figure 8C:
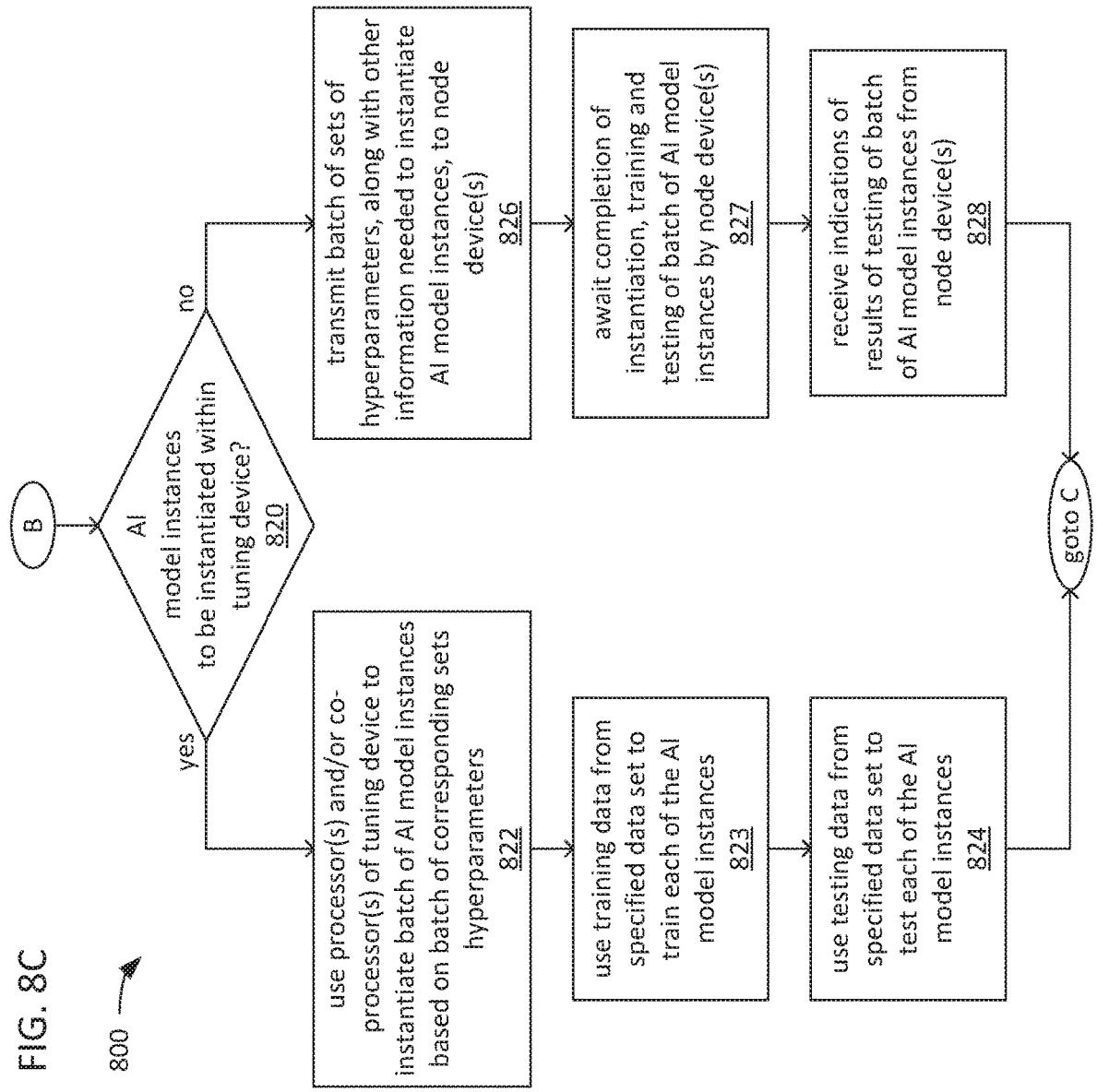
Figure 8D:
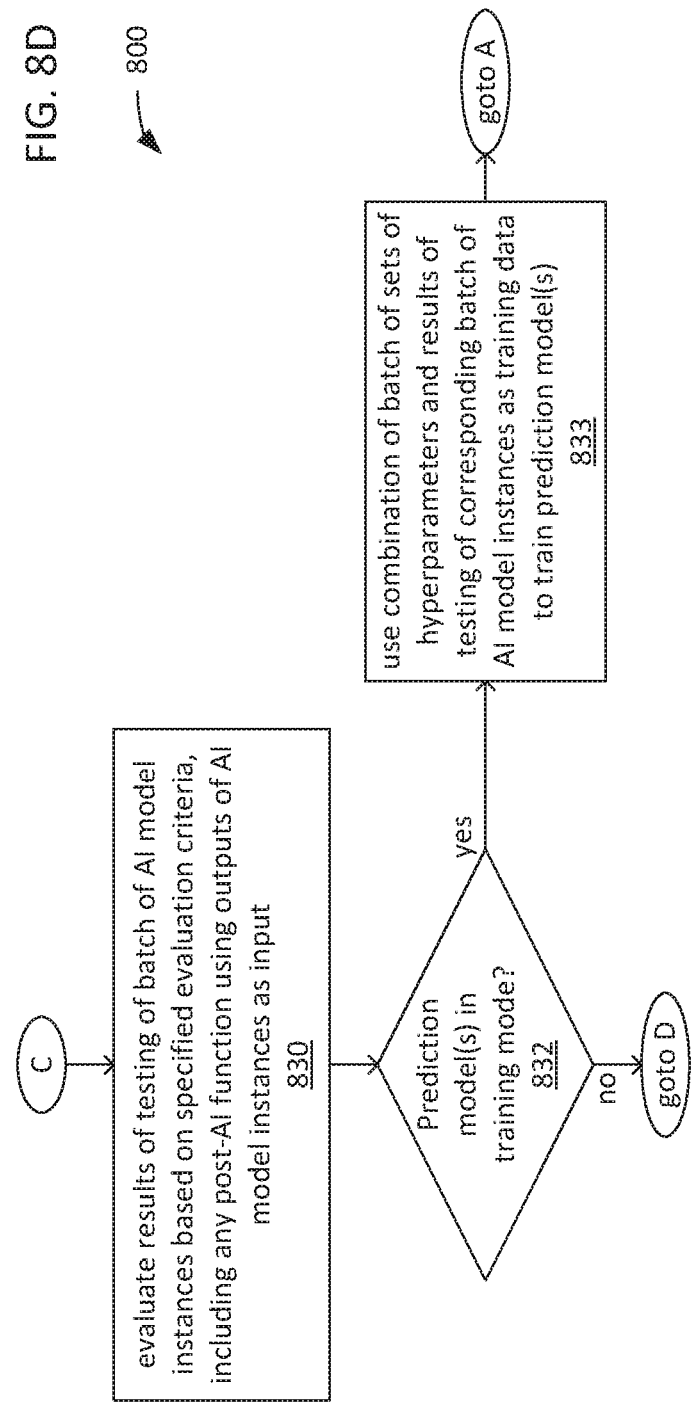
Figure 8E:
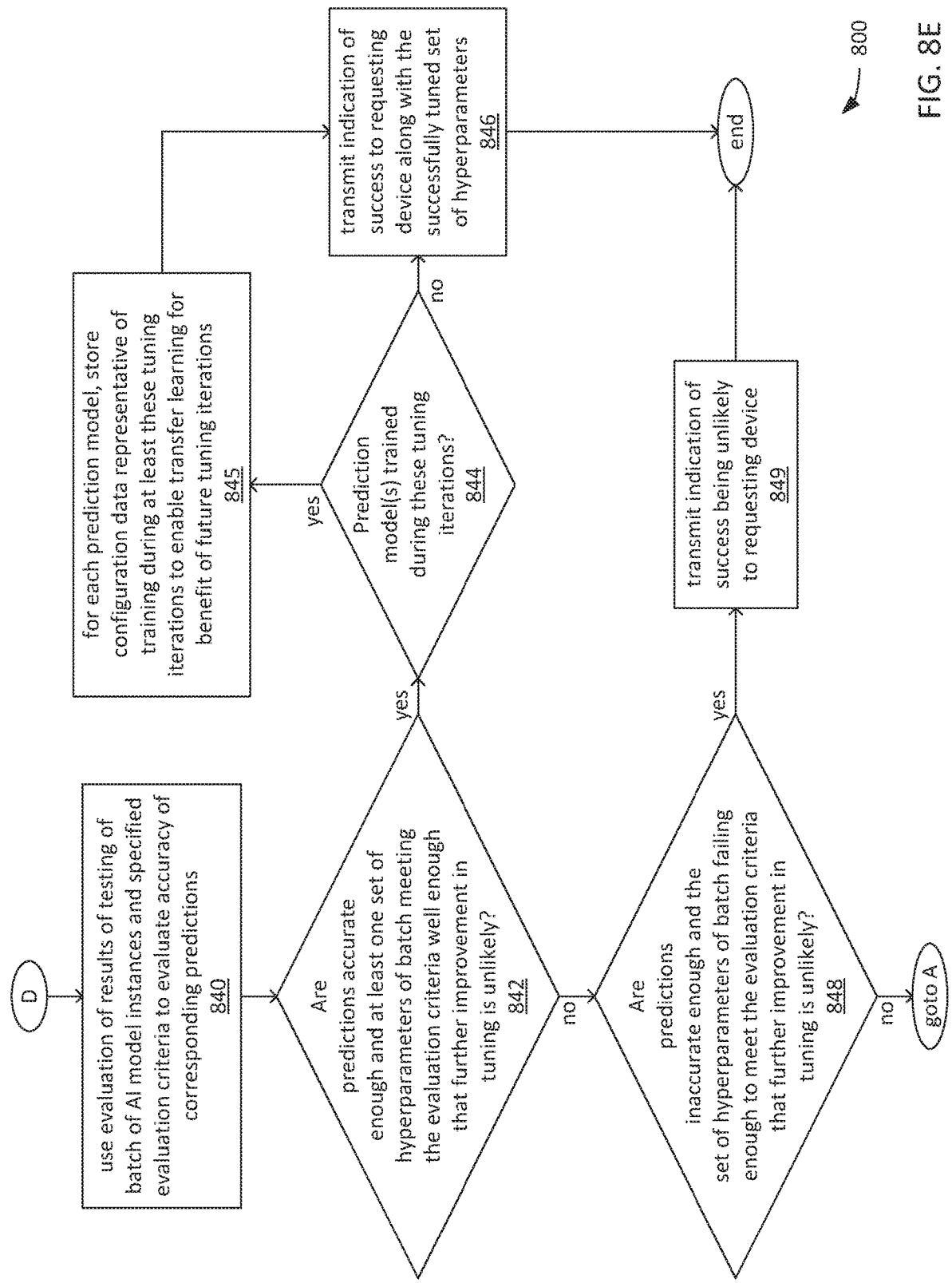

FIGS. 7A through 7C, taken together, illustrate an exemplary use of machine learning to control the performance of tuning of hyperparameters of FIGS. 6A-D. FIG. 7A illustrates an example of preparations to for the training and use of one or more prediction models 773. FIG. 7B illustrates an example of training the one or more prediction models 773 during the performance of initial iterations of tuning hyperparameters. FIG. 7C illustrates an example of using the one or more prediction models 773 to control the performance of subsequent iterations of tuning hyperparameters.

Turning to FIG. 7A, the instantiation component 443 may instantiate the one or more prediction models 773. Again, like the AI model, each of the prediction models 773 may be based on any of a wide variety of types of machine learning model. Each prediction model 773 of the one or more prediction models 773 may be based on a separate one of the prediction model definitions 436, which may each specify the corresponding type of machine learning model.

As shown in FIG. 7B, the control routine 440 may also include an evaluation component 446. Following the testing of each of the instances 673 of the AI model of a batch 670 by the testing component 445 in FIG. 6B or by the testing component 545 in FIG. 6C, the evaluation component 446 may employ the evaluation criteria indicated in the request data 234 to evaluate the results of such testing.

As previously discussed, the one or more prediction models 773 may, initially, be operated in a training mode during the performance of an initial quantity of iterations of the tuning of hyperparameters of the AI model. During such a training mode, the sets 632 (FIG. 6A) of hyperparameters and the corresponding evaluations of the results of the testing of the corresponding instances 673 (FIG. 6C) of the AI model may be employed as training data to train the one or more tuning prediction 773. Such a training mode may continue for a predetermined period of time and/or through a predetermined number of iterations of the performance of the tuning of hyperparameters of the AI model (e.g., through a predetermined number of batches 630 of sets 632 of hyperparameters).

However, and referring to both FIGS. 7A and 7B, where there is an opportunity to employ transfer learning to obtain the benefit of earlier training of each prediction model of the one or more prediction models 773 from a training mode of a previous effort at hyperparameter tuning, then such transfer learning may be employed to obviate the need to again place the one or more prediction models 773 in a training mode, thereby allowing the one or more prediction models 773 to be immediately put to use in prediction mode. More specifically, if there has been a previous use of each prediction model of the one or more prediction models 773 in earlier iterations of an earlier performance of hyperparameter tuning for the same AI model and/or with the same data set 330 (FIG. 6C), and if the predictions generated during those earlier iterations of that earlier performance were deemed sufficiently accurate, and if a prediction model configuration data 437 was generated that captures and includes a representation of the training of the one or more prediction models 773, then the instantiation component 443 may retrieve that prediction model configuration data 437, and may use the training that it represents to instantiate the one or more prediction models 773 with the benefit of the training from that earlier performance through transfer learning.

As shown in FIG. 7C, the control routine 440 may also include a prediction component 447. Following completion of the training mode (or following the instantiation of the one or more prediction models 773 with the benefit of earlier training via transferred learning), the one or more prediction models 773 may then be operated in a prediction mode during which the one or more prediction models 773 may be used to make a prediction of whether each set 632 (FIG. 6A) of hyperparameters within each batch 630 will likely be found (through the testing described as performed in either of FIG. 6B or 6C) to improve the tuning of hyperparameters for the AI model so as to come closer to achieving a threshold specified in the evaluation criteria such that it may be deemed efficacious to actually perform the testing of the set 632 of hyperparameters. Again, such use of the one or more prediction models 773 seeks to reduce instances in which time, as well as processing and/or storage resources, are expended on testing sets 632 of hyperparameters that are deemed unlikely to lead to any improvement in the tuning of hyperparameters for the AI model.

In some embodiments, the evaluation component 446 may use such predictions, along with the evaluations of the results of testing sets 632 of hyperparameters that were deemed efficacious to test, as inputs to determining whether or not the evaluation criteria have been met such that the performance of tuning of hyperparameters of the AI model has been successful, and/or as inputs to determining whether or not the performance of further iterations of the tuning of hyperparameters of the AI model are likely to result in further improvement in the tuning of the hyperparameters. Where the performance of such tuning is determined to have been successful, the evaluation component 446 may cause a cessation of further iterations of the performance, and transmit to the requesting device 102 the results data 236 with an indication of success and/or the set of hyperparameters derived through such tuning.

In such embodiments, and where the performance of such tuning is determined to have been successful, and where the one or more prediction models 773 have been deemed to have made predictions with sufficient accuracy, the prediction model configuration data 437 may be generated by the evaluation component 446 to preserve the results of such successful training of the one ore more prediction models 773 to enable transfer learning to be used for the benefit of a future hyperparameter tuning for the same AI model and with the same data set 330 and same prediction model(s) 773. It should be noted that such generation of the prediction model configuration data 437 may occur only if the prediction model configuration data 437 does not already exist, and was not used in instantiating the one or more prediction models 773 without any additional training following such instantiation.

Alternatively or additionally, where it is determined that further iterations of performance of such tuning are unlikely to result in the successful derivation of a tuned set of hyperparameters (or in other words, it is determined to be unlikely that the hyperparameters will converge to a location within the hyperparameter search space that results in the evaluation criteria being met), the evaluation component 446 may cause a cessation of further iterations of the performance, and transmit to the requesting device 102 the results data 236 with an indication of cessation with a prediction of there being no likelihood of success. In some embodiments, a lack of accuracy meeting a predetermined threshold for the predictions using the one or more prediction models 773 may serve as another basis for the evaluation component 446 to cause such a cessation of further iterations due to there being no likelihood of success. Such a lack of accuracy of the predictions may be taken as an indication that a convergence of the hyperparameters to a single location within the hyperparameter search space is unlikely to occur, as it should otherwise be possible to achieve better accuracy.

Again, as previously discussed, in some embodiments, the evaluation of results of testing each instance 673 of the AI model may entail evaluating the outputs of the instance 673 of the AI model, directly. However, as also previously discussed, in other embodiments, the evaluation of the results of testing each instance 673 of the AI model may entail evaluating the output(s) of a post-AI function that generates its output(s) from the outputs of the instance 673 of the AI model.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

FIGS. 8A through 8E, taken together, illustrate an embodiment of a logic flow 800. The logic flow 800 may be representative of some or all of the operations executed by one or more embodiments described herein. For example, the logic flow 800 may include some or all of the operations performed to tune hyperparameters of an AI model. However, embodiments are not limited in this context.

At 802, a processor of a tuning device of a system may receive a request to perform a tuning of the hyperparameters of an AI model from a requesting device. The request may including information specifying the type and/or other aspects of the AI model, the boundaries of the hyperparameter search space to which the tuning of the hyperparameters is to be limited, an initial set of hyperparameters that define a starting point within the hyperparameter search space at which the tuning is to begin, an identifier of a data set from which training data and/or testing data is to be provided for use in the performance of tuning, the one or more prediction models to be used in making predictions concerning the efficacy of further iterations of tuning, and/or evaluation criteria by which aspects of the success of the performance and/or the efficacy of continuing with the performance may be determined.

At 804, if the particular combination of the specified type of AI model, specified data set and/or specified one or more prediction models has not been used together, before, in turning hyperparameters for the specified type of AI model, then at 807, the processor may instantiate the one or more prediction models that are to be used in controlling the performance of iterations of the tuning. Upon being so instantiated, the one or more prediction models may be placed by the processor into a training mode, during which the one or more prediction models may be trained in preparation for being used to make predictions. As previously discussed, any of a variety of criteria may be used to trigger the transition of the one or more prediction models from the training mode and into a prediction mode in which the one or more prediction models are used to generate predictions concerning the efficacy of performances of iterations of the tuning of the hyperparameters. Such criteria may include, and is not limited to, a predetermined quantity of training data used to train the one or more prediction models, the passage of a predetermined amount of time since the performance of the tuning of hyperparameters commenced, etc. Thus, the transition from training mode to prediction mode may occur at any point throughout the logic flow 800.

However, if at 804, the particular combination of the specified type of AI model, specified data set and/or specified one or more prediction models has been used together, before, in previous iterations of performance of tuning hyperparameters for the specified type of AI model, then at 806, the processor may check whether the predictions made by the one or more prediction models in that previous use were sufficiently accurate as to meet a predetermined threshold of accuracy for such predictions. If not, at 806, then the processor may proceed with instantiating the one or more prediction models at 807 without the benefit of any transfer to the one or more prediction models of any training that may have occurred during that previous use.

However, if at 806, the predictions made by the one or more prediction models in that previous use were sufficiently accurate, then at 808, the processor may retrieve configuration data that is representative of what was learned by the one or more prediction models during that previous use to gain the benefit of that earlier training through transfer learning. At 809, the processor may then use that configuration data to instantiate the one or more prediction models with the benefit of their training from that previous use. Upon being so instantiated, the one or more prediction models may be placed by the processor into the prediction mode.

At 810, the processor may employ any of a wide variety of hyperparameter generation techniques to generate a batch of hyperparameters for the AI model within the boundaries of the hyperparameter search space, and using the initial set of hyperparameters as the starting point therein.

At 812, if the one or more prediction models are in the prediction mode, then the processor 813 may use the one or more prediction models to make predictions concerning the efficacy of expending time, as well as processing and/or storage resources to test the multiple sets of hyperparameters in the batch just generated at 810. More precisely, predictions may be made of whether such an expenditure of time and/or other resources is likely to beget test results that will indicate that at least one of the sets of hyperparameters within the batch is successfully an improvement over previous sets of hyperparameters that have been tested such that the evaluation criteria for successfully deriving a set of hyperparameters is at least closer to being met such that an improvement in the tuning of hyperparameters of the AI model has been successfully made.

At 815, if such success is not predicted to be likely, then the processor may make a determination at 816 of whether success in further improving the tuning of the set of hyperparameters is likely from continuing to perform further iterations of the tuning. If, at 818, such success is determined to be likely, then the processor may generate another batch of sets of hyperparameters at 810. However, if at 818, such success is determined to be unlikely, then the processor may transmit an indication of success in the tuning of the hyperparameters being unlikely to the requesting device at 819.

However, if the tuning models are still in the training mode at 812, or if success in improving the tuning of hyperparameters of the AI model from testing the batch of sets of hyperparameters is predicted to be likely at 815, then the processor may make a check at 820 of whether instances of the AI model are to be generated using resources of the tuning device. If resources of the tuning device are to be so used, then at 822, one or more processors and/or co-processors of the tuning device may be used to instantiate a batch of instances of the AI model in which each instance within that batch corresponds to one of the sets of hyperparameters in the batch of sets of hyperparameters. At 823, the one or more processors and/or co-processors of the tuning device may then use a training data taken from the specified data set to train each of the instances of the AI model. At 824, the one or more processor and/or co-processors of the tuning device may use testing data taken from the specified data set to test each of the instances of the AI model, and in so doing, effectively test each of the sets of hyperparameters within the batch of sets of hyperparameters.

However, if at 820, such resources of the tuning device are not to be so used, then at 826, the processor of the tuning device may transmit the batch of sets of hyperparameters to one or more node devices, along with other information needed to instantiate the corresponding batch of instances of the AI model. At 827, the processor of the tuning device may await the completion of such instantiation of the batch of instances of the AI model, as well as the training and testing thereof, by the one or more node devices. At 828, the processor of the tuning device may receive indications of the results of such testing of the batch of instances of the AI model from the one or more node devices.

At 830, regardless of whether resources of the tuning device or of one or more node devices were used to instantiate, train and test the batch of instances of the AI model, the processor of the tuning device may employ the specified evaluation criteria to evaluate the results of such testing. As has been discussed, in some embodiments, such an evaluation of testing may entail evaluating the outputs of each of the instances of the AI model, directly, while in other embodiments, such an evaluation of testing may entail evaluating an output of a post-AI function that accepts the outputs of an instance of the AI model as its inputs.

At 832, if the one or more tuning models are in training mode, then the processor may use the combination of the batch of sets of hyperparameters and the results of the evaluation of the testing of the corresponding batch of instances of the AI model as training data to train the one or more tuning models at 833. The processor may then proceed to generate another batch of sets of hyperparameters at 810.

However, if at 832, the one or more tuning models are in the prediction mode, then at 840, the processor may use the evaluation of the results of the testing of the batch of instances of the AI model along with the specified evaluation criteria to evaluate the accuracy of the corresponding predictions that were made prior to the instantiation, training and testing of that batch of instances. If at 842, the processor determines that the predictions were accurate enough (based on the evaluation criteria), and that at least one of the sets of hyperparameters within that batch thereof meets the evaluation criteria well enough that further improvement through further iterations of the performance of tuning of hyperparameters is deemed to be unlikely, then at 844, the processor may check whether the one or more prediction models were trained during these iterations of turning of hyperparameters for the AI model in response to received request. If not, then at 846, the processor may transmit an indication of success in deriving a tuned set of the hyperparameters to the requesting device, along with an indication of that successfully tuned set of hyperparameters. However, if at 844, the one or more prediction models were trained during these iterations of tuning of hyperparameters for the AI model in response to the received request, then before making such a transmission at 846, at 845, the processor may store configuration data representative of that training for each prediction model of the one or more prediction models to enable advantage to be taken of that training in future hyperparameter tuning iteration.

However, if at 842, the processor does not determine that the predictions were accurate enough and/or if the processor determines that none of the sets of hyperparameters within that batch meets the evaluation criteria, then the processor may evaluate the degree of inaccuracy and/or failure to meet the evaluation criteria. More specifically, at 848, if the processor determines that the predictions are inaccurate enough and that all of the sets of hyperparameters within that batch fail to meet the evaluation criteria by a great enough degree, then the processor may transmit an indication of success in the tuning of the hyperparameters being unlikely to the requesting device at 849. This may be based on a presumption that these factors indicate that it is not possible for the hyperparameters to converge sufficiently.

However, if at 848, the processor determines that the predictions are not quite so inaccurate and/or that one or more sets of hyperparameters within the batch does not fail to meet the evaluation criteria to quite such a degree, then the processor may return to generating another batch of sets of hyperparameters at 810.

Figure 9:
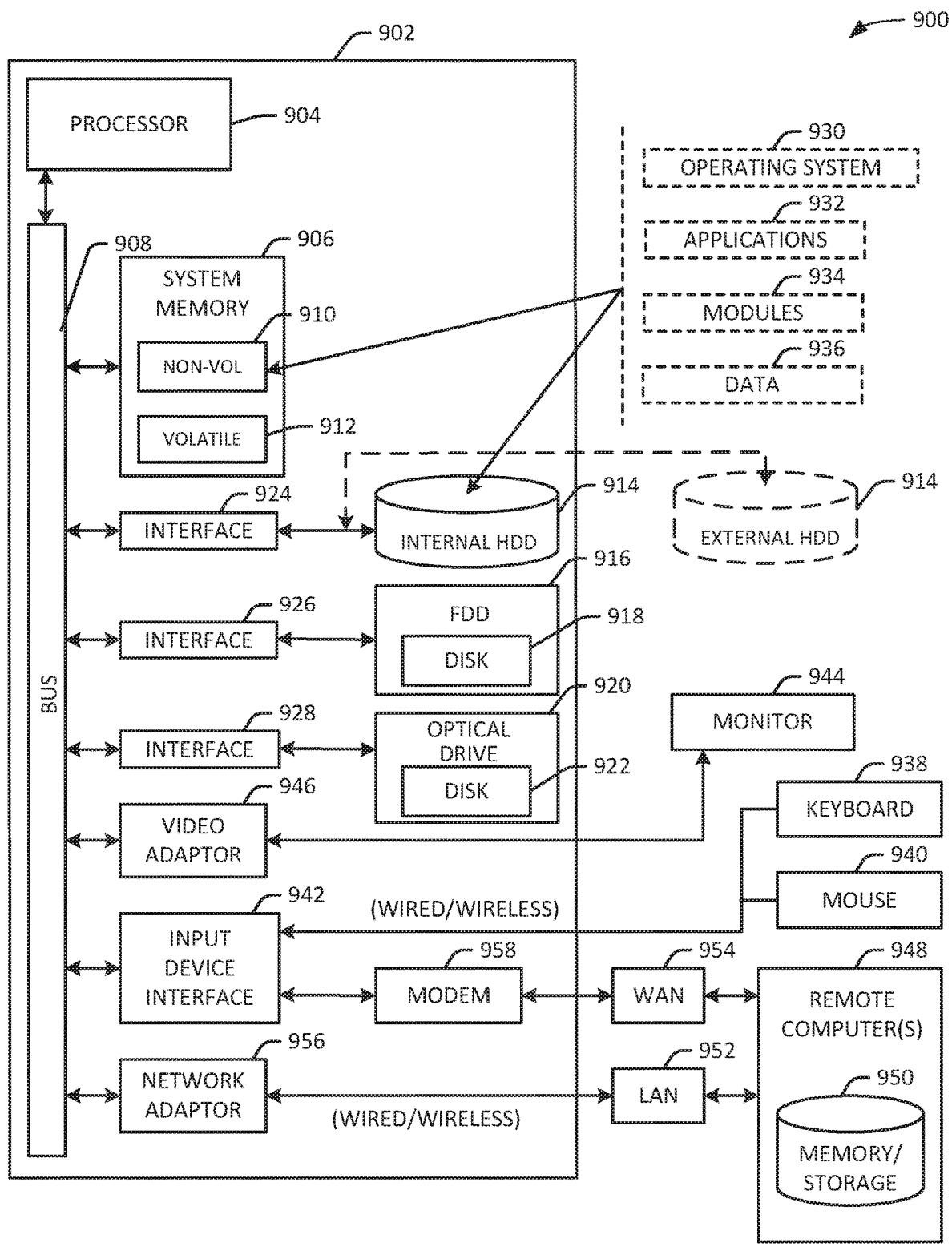
FIG. 9 illustrates an embodiment of a computing architecture.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100. In some embodiments, computing system 902 may be representative, for example, of the devices 102, 103, 104 and/or 105 of the system 100. The embodiments are not limited in this context. More generally, the computing architecture 900 may be configured to implement the logic, applications, systems, methods, GUIs, apparatuses, and functionality described herein with reference to the preceding figures.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

More specifically, the computing system 902 comprises a processor 904, a system memory 906 and a system bus 908. The processor 904 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to the preceding figures.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100, e.g., the control routines 240, 340, 440 and/or 540.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet. In various embodiments, the network 109 may be one or more of the LAN 952 and the WAN 954.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A non-transitory computer-readable medium storing instructions configured to cause one or more processors to:
   determine a plurality of batches of hyperparameters for an artificial intelligence (AI) model, the plurality of batches of hyperparameters configured to be tuned according to a hyperparameter tuning technique based on a success metric, each of the plurality of batches of hyperparameters comprising a different set of hyperparameters, the different set of hyperparameters for at least a portion of the plurality of batches of hyperparameters selected based on previous test results;
   instantiate a batch of instances of the AI model, each of the instances of the AI model generated based on a different one the plurality of batches of hyperparameters;
   for each instance of the AI model and a set of hyperparameters associated with the instance of the AI model, at least partially in parallel:
      train the instance of the AI model using training data;
      test the instance of the AI model using testing data to generate AI model testing results;
      train a prediction model using a machine learning process and the AI model testing results, the prediction model configured to estimate whether further application of the hyperparameter tuning technique will cause an improvement in the success metric;
      test the hyperparameters using the hyperparameter tuning technique until a stopping point;
      apply the prediction model to determine if further testing of the hyperparameters after the stopping point is predicted to improve the success metric; and
      terminate the hyperparameter tuning technique when:
         (i) an accuracy of the prediction model in predicting improvement in the success metric is above a predetermined accuracy threshold, and the prediction model predicts that further application of the hyperparameter tuning technique will not result in an improvement to the success metric; or
         (ii) the accuracy of the prediction model in predicting improvement in the success metric is below the predetermined accuracy threshold, and an accuracy of hyperparameter optimization is determined to be below a predetermined tuning accuracy threshold.

2. The medium of claim 1, further storing instructions for continuing the hyperparameter tuning technique when the accuracy of the prediction model in predicting improvement in the success metric is below the predetermined accuracy threshold and the accuracy of hyperparameter optimization is determined to be above the predetermined tuning accuracy threshold.

3. The medium of claim 1, further storing instructions for:
   receiving a next batch of hyperparameters to be tested by the hyperparameter tuning technique;
   applying the prediction model to predict whether the next batch of hyperparameters is likely to result in improvement of the success metric; and
   causing the hyperparameter optimization to skip the next batch of hyperparameters if the prediction model does not predict improvement in the success metric.

4. The medium of claim 1, wherein at least one of the predetermined accuracy threshold or the predetermined tuning accuracy threshold are configured to bias against terminating the hyperparameter tuning technique.

5. The medium of claim 1, wherein the success metric comprises one or more of: an accuracy of the AI model, a speed of convergence of the hyperparameter tuning technique, a loss function, a speed of assessment of the AI model, or a speed of training of the AI model.

6. The medium of claim 1, wherein the prediction model is configured to be applied in parallel across a plurality of computing devices.

7. The medium of claim 1, further storing instructions for applying the prediction model to select a next batch of hyperparameters based on a likelihood that the next batch of hyperparameters will improve the success metric, and testing the next batch of hyperparameters with the hyperparameter tuning technique.

8. An apparatus comprising:
a non-transitory computer-readable medium storing a set of hyperparameters for an artificial intelligence (AI) model, the hyperparameters configured to be adjusted according to a hyperparameter selection technique based on one or more parameters; and
a processor configured to:
    determine a plurality of batches of hyperparameters, each of the plurality of batches of hyperparameters comprising a different set of hyperparameters, the different set of hyperparameters for at least a portion of the plurality of batches of hyperparameters selected based on previous test results;
    instantiate a batch of instances of the AI model, each of the instances of the AI model generated based on a different one the plurality of batches of hyperparameters;
    for each instance of the AI model and a set of hyperparameters associated with the instance of the AI model, at least partially in parallel:
        train the instance of the AI model using training data;
        test the instance of the AI model using testing data to generate AI model testing results;
        train a prediction model using a machine learning process and the AI model testing results, the prediction model configured to estimate whether further application of the hyperparameter selection technique will cause an improvement in a success metric;
    select the hyperparameters using the hyperparameter selection technique;
    apply the prediction model to determine if further adjustment of the hyperparameters is likely to improve the success metric; and
    terminate the hyperparameter selection technique when:
        (i) an accuracy of the prediction model in predicting improvement in at least one of the hyperparameters is above a predetermined accuracy threshold, and the prediction model predicts that further application of the hyperparameter selection technique will not result in an improvement in at least one of the hyperparameters; or
        (ii) the accuracy of the prediction model in predicting improvement in at least one of the hyperparameters is below the predetermined accuracy threshold, and an accuracy of hyperparameter adjustment is determined to be below a predetermined adjustment accuracy threshold.

9. The apparatus of claim 8, wherein the processor is further configured to continue the hyperparameter selection technique when the accuracy of the prediction model in predicting improvement in at least one of the hyperparameters is below the predetermined accuracy threshold and the accuracy of hyperparameter adjustment is determined to be above the predetermined adjustment accuracy threshold.

10. The apparatus of claim 8, wherein the processor is further configured to:
    receive a next batch of hyperparameter adjustments to be applied by the hyperparameter selection technique;
    apply the prediction model to predict whether the next batch of hyperparameter adjustments is likely to result in improvement of at least one of the hyperparameters; and
    cause the hyperparameter selection technique to skip the next batch of hyperparameter adjustments if the prediction model does not predict improvement in at least one of the hyperparameters.

11. The apparatus of claim 8, wherein at least one of the predetermined accuracy threshold or the predetermined adjustment accuracy threshold are configured to bias against terminating the hyperparameter selection technique.

12. The apparatus of claim 8, wherein the success metric comprises one or more of: an accuracy of the AI model, a speed of convergence of the hyperparameter selection technique, a loss function, a speed of assessment of the AI model, or a speed of training of the AI model.

13. The apparatus of claim 8, wherein the prediction model is configured to be applied in parallel across a plurality of computing devices.

14. A computer-implemented method, comprising, via at least one processor of at least one computing device:
    determining a plurality of batches of hyperparameters for an artificial intelligence (AI) model, the plurality of batches of hyperparameters configured to be tuned according to a hyperparameter tuning technique based on a success metric, each of the plurality of batches of hyperparameters comprising a different set of hyperparameters, the different set of hyperparameters for at least a portion of the plurality of batches of hyperparameters selected based on previous test results;
    instantiating a batch of instances of the AI model, each of the instances of the AI model generated based on a different one the plurality of batches of hyperparameters;
    for each instance of the AI model and a set of hyperparameters associated with the instance of the AI model, at least partially in parallel:
        training the instance of the AI model using training data;
        testing the instance of the AI model using testing data to generate AI model testing results;
        training a prediction model using a machine learning process and the AI model testing results, the prediction model configured to estimate whether further application of the hyperparameter tuning technique will cause an improvement in the success metric;
    testing the hyperparameters using the hyperparameter tuning technique until a stopping point;
    applying the prediction model to determine if further testing of the hyperparameters after the stopping point is predicted to improve the success metric; and
    terminate the hyperparameter tuning technique when:
        (i) an accuracy of the prediction model in predicting improvement in the success metric is above a predetermined accuracy threshold, and the prediction model predicts that further application of the hyperparameter tuning technique will not result in an improvement to the success metric; or
        (ii) the accuracy of the prediction model in predicting improvement in the success metric is below the predetermined accuracy threshold, and an accuracy of hyperparameter optimization is determined to be below a predetermined tuning accuracy threshold.

15. The computer-implemented method of claim 14, further comprising continuing the hyperparameter tuning technique when the accuracy of the prediction model in predicting improvement in the success metric is below the predetermined accuracy threshold and the accuracy of hyperparameter optimization is determined to be above the predetermined tuning accuracy threshold.

16. The computer-implemented method of claim 14, further comprising:
   receiving a next batch of hyperparameters to be tested by the hyperparameter tuning technique;
   applying the prediction model to predict whether the next batch of hyperparameters is likely to result in improvement of the success metric; and
   causing the hyperparameter optimization to skip the next batch of hyperparameters if the prediction model does not predict improvement in the success metric.

17. The computer-implemented method of claim 14, wherein at least one of the predetermined accuracy threshold or the predetermined tuning accuracy threshold are configured to bias against terminating the hyperparameter tuning technique.

18. The computer-implemented method of claim 14, wherein the success metric comprises one or more of: an accuracy of the AI model, a speed of convergence of the hyperparameter tuning technique, a loss function, a speed of assessment of the AI model, or a speed of training of the AI model.

19. The computer-implemented method of claim 14, wherein the prediction model is configured to be applied in parallel across a plurality of computing devices.

20. The computer-implemented method of claim 14, further comprising applying the prediction model to select a next batch of hyperparameters based on a likelihood that the next batch of hyperparameters will improve the success metric, and testing the next batch of hyperparameters with the hyperparameter tuning technique.

* * * * *